United States Patent
Tsuji

(10) Patent No.: US 9,547,463 B2
(45) Date of Patent: Jan. 17, 2017

(54) IMAGE FORMATION SYSTEM AND IMAGE FORMATION METHOD

(71) Applicant: Oki Data Corporation, Tokyo (JP)

(72) Inventor: Yoshiaki Tsuji, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/745,554

(22) Filed: Jun. 22, 2015

(65) Prior Publication Data

US 2015/0378650 A1 Dec. 31, 2015

(30) Foreign Application Priority Data

Jun. 30, 2014 (JP) ................................ 2014-134004

(51) Int. Cl.
  *G06F 3/12* (2006.01)
  *H04L 29/08* (2006.01)
  *G06K 15/00* (2006.01)

(52) U.S. Cl.
  CPC ........... *G06F 3/1231* (2013.01); *G06F 3/1285* (2013.01); *H04L 67/1095* (2013.01)

(58) Field of Classification Search
  None
  See application file for complete search history.

(56) References Cited

U.S. PATENT DOCUMENTS

| 5,706,411 A * | 1/1998 | McCormick | G06K 15/00 358/1.14 |
| 6,369,906 B1 * | 4/2002 | Nakao | G06K 15/00 358/1.13 |
| 2011/0213874 A1 * | 9/2011 | Layton | G06F 11/0709 709/224 |

FOREIGN PATENT DOCUMENTS

JP    2013-174981 A    9/2013

* cited by examiner

*Primary Examiner* — Dov Popovici
(74) *Attorney, Agent, or Firm* — Mots Law, PLLC

(57) ABSTRACT

A method includes: sending a transmission instruction to send status information indicating a state of an image formation apparatus; receiving a status information in response to the transmission instruction; determining, based on the status information, whether to permit a lock instruction to be sent causing the image formation apparatus to shift to a locked state in which only image formation instructed by a first external apparatus is executable; sending the lock instruction when the lock instruction is permitted to be sent; causing the image formation apparatus to shift to the locked state in accordance with the sent lock instruction; sending an unlock instruction to cancel the locked state; and causing the image formation apparatus to shift to an unlocked state in accordance with the sent unlock instruction. The lock instruction is permitted to be sent when the image formation apparatus is determined to not be in the locked state.

25 Claims, 16 Drawing Sheets

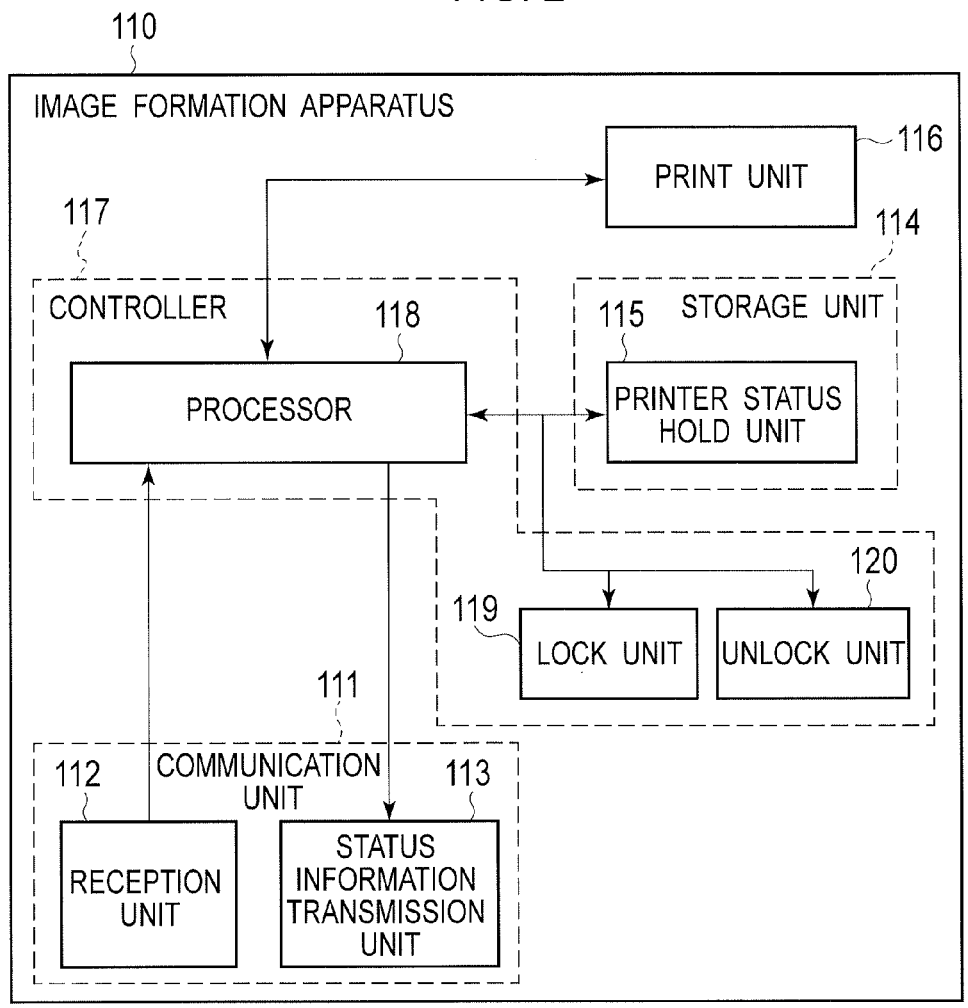

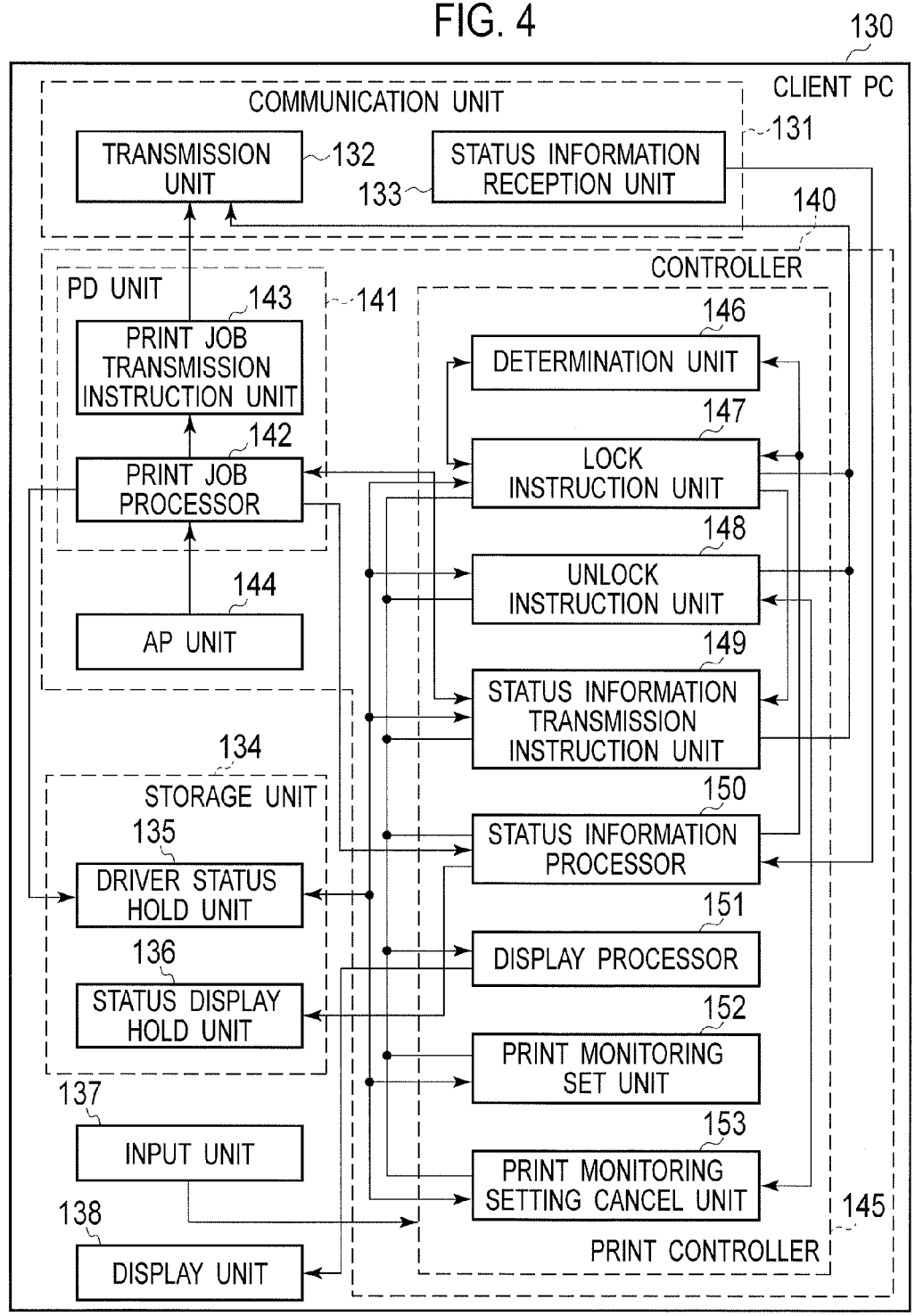

IMAGE FORMATION SYSTEM AND IMAGE FORMATION METHOD

CROSS REFERENCE TO RELATED APPLICATIONS

This application claims priority based on 35 USC 119 from prior Japanese Patent Application No. 2014-134004 filed on Jun. 30, 2014, entitled "IMAGE FORMATION SYSTEM AND IMAGE FORMATION METHOD", the entire contents of which are incorporated herein by reference.

BACKGROUND OF THE INVENTION

1. Field of the Invention

The disclosure relates to an image formation system and an image formation method.

2. Description of Related Art

Conventionally, there is a system in which multiple host PCs are connected to a printer. For example, Patent Literature 1 discloses an image formation system in which multiple host PCs and a printer are connected to a network.

[Patent Literature 1] Japanese Patent Application Publication No. 2013-174981

SUMMARY OF THE INVENTION

For the conventional system, there is a case where an external apparatus such as one host PC is desired to exclusively use an image formation apparatus such as a printer.

Therefore, an object of one embodiment of the invention is to enable one external apparatus to exclusively use an image formation apparatus.

A first aspect of the invention is an image formation system including at least an image formation apparatus, a first external apparatus, and a second external apparatus. The image formation system comprises: a status information transmission instruction unit that sends a status information transmission instruction to send status information indicating a state of the image formation apparatus; a processor that sends the status information in response to the sent status information transmission instruction; a status information processor that receives the status information; a determination unit that determines whether to permit a lock instruction to be sent on the basis of the status information received by the status information processor, the lock instruction causing the image formation apparatus to shift to a locked state in which only an image formation instructed by the first external apparatus is executable; a lock instruction unit that sends the lock instruction when the determination unit permits; a lock unit that causes the image formation apparatus to shift to the locked state in accordance with the sent lock instruction; an unlock instruction unit that sends an unlock instruction that is an instruction to cancel the locked state; and an unlock unit that causes the image formation apparatus to shift to an unlocked state in accordance with the sent unlock instruction. The determination unit permits the lock instruction to be sent when determining that the image formation apparatus is not in the locked state on the basis of the status information.

A second aspect of the invention is an image formation method executed by an image formation system including at least an image formation apparatus, a first external apparatus, and a second external apparatus. The image formation method comprises: sending a status information transmission instruction to send status information indicating a state of the image formation apparatus; sending the status information in response to the sent status information transmission instruction; receiving the status information; determining whether to permit a lock instruction to be sent on the basis of the status information thus received, the lock instruction causing the image formation apparatus to shift to a locked state in which only the image formation instructed by the first external apparatus is executable; sending the lock instruction when the lock instruction is permitted to be sent; causing the image formation apparatus to shift to the locked state in accordance with the sent lock instruction; sending an unlock instruction that is an instruction to cancel the locked state; and causing the image formation apparatus to shift to an unlocked state in accordance with the sent unlock instruction. In the determining whether to permit a lock instruction to be sent, the lock instruction is permitted to be sent when it is determined that the image formation apparatus is not in the locked state on the basis of the status information.

With the above aspect(s), one of the external apparatus can exclusively use the image formation apparatus.

BRIEF DESCRIPTION OF THE DRAWINGS

FIG. 2 is a block diagram schematically illustrating a configuration of an image formation apparatus in the first embodiment;

FIG. 3 is a schematic view illustrating an example of printer status data in the first embodiment;

FIG. 4 is a block diagram schematically illustrating a configuration of a client PC in the first embodiment;

DETAILED DESCRIPTION OF EMBODIMENTS

Figure 1:
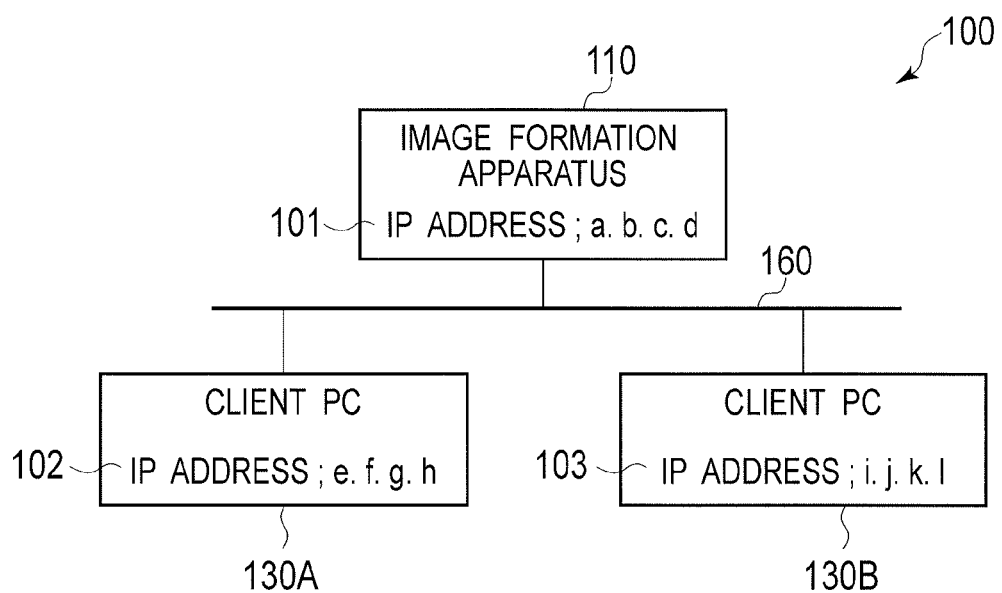
FIG. 1 is a schematic view illustrating a configuration of an image formation system according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

First Embodiment

Explanation of Configuration

FIG. 1 is a schematic view illustrating a configuration of image formation system 100 according to a first embodiment. As illustrated in FIG. 1, image formation system 100 is provided with image formation apparatus 110, client PC 130A serving as a first external apparatus (or a first higher-level apparatus), and client PC 130B serving as a second external apparatus (or a second higher-level apparatus). Hereinafter, client PC 130A and client PC 130B are collectively called client PCs 130 when there is no particular need to distinguish therebetween. Image formation apparatus 110 and client PCs 130 are connected to network 160. Image formation apparatus 110, client PC 130A, and client PC 130B are assigned with IP address 101, IP address 102, and IP address 103, respectively. Further, an image formation method in the first embodiment is executed by image formation system 100.

FIG. 2 is a block diagram schematically illustrating a configuration of image formation apparatus 110. Image formation apparatus 110 is provided with communication unit 111, storage unit 114, print unit 116 serving as an image formation unit, and controller 117.

Communication unit 111 performs communication with network 160. Communication unit 111 is provided with reception unit 112 and status information transmission unit 113. Reception unit 112 receives print job 170 as an image formation job, lock command 171 as a lock instruction, unlock command 172 as an unlock instruction, and printer status transmission command 173 as a status information transmission instruction, all of which are that transmitted from client PC 130, and provides the job and the commands to controller 117. Status information transmission unit 113 receives an instruction from controller 117, and transmits printer status information 174 as status information to client PC 130.

Storage unit 114 stores therein information necessary for processing in image formation apparatus 110. Storage unit 114 is provided with printer status hold unit 115 serving as an image formation apparatus status hold unit. Printer status hold unit 115 is an image formation status hold unit that holds printer status data (image formation status data) indicating a current state of image formation apparatus 110. FIG. 3 is a schematic view illustrating an example of the printer status data. As illustrated in FIG. 3, printer status data 115a is data of a table form that includes lock IP address column 115b, and printer status column 115c as an image formation status column. Lock IP address column 115b stores therein an IP address of client PC 130 having locked image formation apparatus 110. If image formation apparatus 110 is not locked, this column is vacant. Printer status column 115c stores therein printer status data (image formation status data) indicating a current state of image formation apparatus 110.

Referring back to the explanation in FIG. 2, print unit 116 is a device that receives an instruction from controller 117 to execute printing (image formation) on the basis of print job 170.

Controller 117 controls the processing in image formation apparatus 110. Controller 117 is provided with processor 118, lock unit 119, and unlock unit 120. Processor 118 requests lock unit 119, unlock unit 120, status information transmission unit 113, and print unit 116 for processing in accordance with print job 170, lock command 171, unlock command 172, and printer status transmission command 173 that are provided from reception unit 112, depending on printer status data 115a held in printer status hold unit 115. Moreover, processor 118 stores the current state of image formation apparatus 110 in printer status data 115a. Lock unit 119 receives an instruction from processor 118 to set image formation apparatus 110 in a locked state. For example, lock unit 119 sets a flag indicating that storage unit 114 is in the locked state. This allows processor 118 to recognize that image formation apparatus 110 is in the locked state. Unlock unit 120 receives an instruction from processor 118 to cancel the locked state of image formation apparatus 110. For example, unlock unit 120 clears the flag set in storage unit 114. This allows processor 118 to recognize that image formation apparatus 110 is not in the locked state. Herein, when image formation apparatus 110 is in the locked state, processor 118 causes print unit 116 to execute printing (image formation) instructed from client PC 130 that is locked, and prevents print unit 116 from executing the printing instructed from client PC 130 except when client PC 130 is locked. Further, when the locked state is cancelled, processor 118 causes print unit 116 to execute printing instructed from any client PC 130.

Controller 117 described above can be implemented such that, for example, a central processing unit (CPU) executes a predetermined program stored in storage unit 114. Moreover, storage unit 114 can be implemented such that, for example, the CPU utilizes a nonvolatile memory such as a read only memory (ROM), or a storage device such as a random access memory (RAM) or a hard disc drive (HDD). Moreover, communication unit 111 can be implemented such that the CPU utilizes a communication device such as a network interface card (NIC). Further, the whole part or a part of controller 117 is not limited to be implemented as software on a computer system. For example, the whole part or a part of controller 117 may be implemented as a hardware by an integrated logic IC, such as an application specific integrated circuit (ASIC) and a field programmable gate array (FPGA), or may be implemented as software by a digital signal processor (DSP) or the like.

FIG. 4 is a block diagram schematically illustrating a configuration of client PC 130. Client PC 130 is provided with communication unit 131, storage unit 134, input unit 137, display unit 138, and controller 140.

Communication unit 131 performs communication with network 160. Communication unit 131 is provided with transmission unit 132 and status information reception unit 133. Transmission unit 132 receives an instruction from controller 140 to transmit print job 170, lock command 171, unlock command 172, and printer status transmission command 173 to image formation apparatus 110. Status information reception unit 133 receives printer status information 174 transmitted from image formation apparatus 110, and provides printer status information 174 to controller 140.

Figure 5:
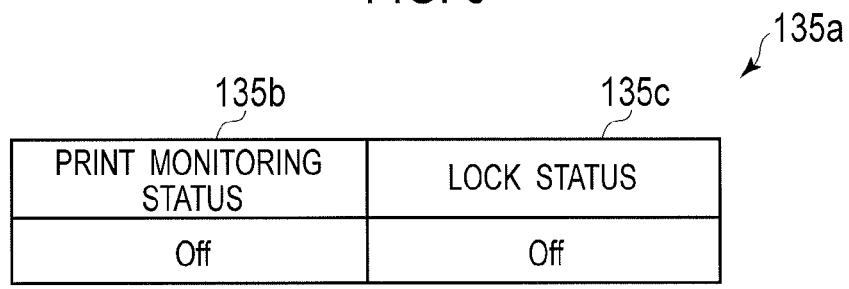
FIG. 5 is a schematic view illustrating an example of driver status data in the first embodiment.

Storage unit 134 stores therein information necessary for processing in client PC 130. Storage unit 134 is provided with driver status hold unit 135 and status display hold unit 136. Driver status hold unit 135 stores therein driver status data including a print monitoring status (image formation status) indicating whether client PC 130 is in a state of monitoring printing (image formation) in image formation apparatus 110, and a lock status indicating whether image formation apparatus 110 is in a locked state. FIG. 5 is a schematic view illustrating an example of driver status data. Driver status data 135a is data of a table form including print monitoring status column 135b and lock status column 135c. Print monitoring status column 135b stores therein a print monitoring status. For example, the print monitoring status indicates that client PC 130 is in a state of monitoring the printing in image formation apparatus 110 if a value is "on", and indicates that client PC 130 is in a state of not monitoring the printing in image formation apparatus 110 if a value is "off". Lock status column 135c stores therein a lock status. For example, the lock status indicates a state in which client PC 130 locks image formation apparatus 110 if a value is "on", indicates that client PC 130 receives an unlock instruction in a state of locking image formation apparatus 110 and monitoring printing in image formation apparatus 110 if a value is "on (unlock pending)", and indicates a state in which client PC 130 does not lock image formation apparatus 110 if a value is "off". Further, controller 140 sets a value for driver status data 135a.

Figure 6:
FIG. 6 is a schematic view illustrating an example of status display data in the first embodiment.

Referring back to the explanation in FIG. 4, status display hold unit 136 stores therein status display data including a status (display status) displayed in display unit 138. FIG. 6 is a schematic view illustrating an example of status display data. Status display data 136a stores therein a display status. The display status indicates any one of a value indicating a lock status, a value indicating a printer status, and a value indicating no display status.

Figure 7:
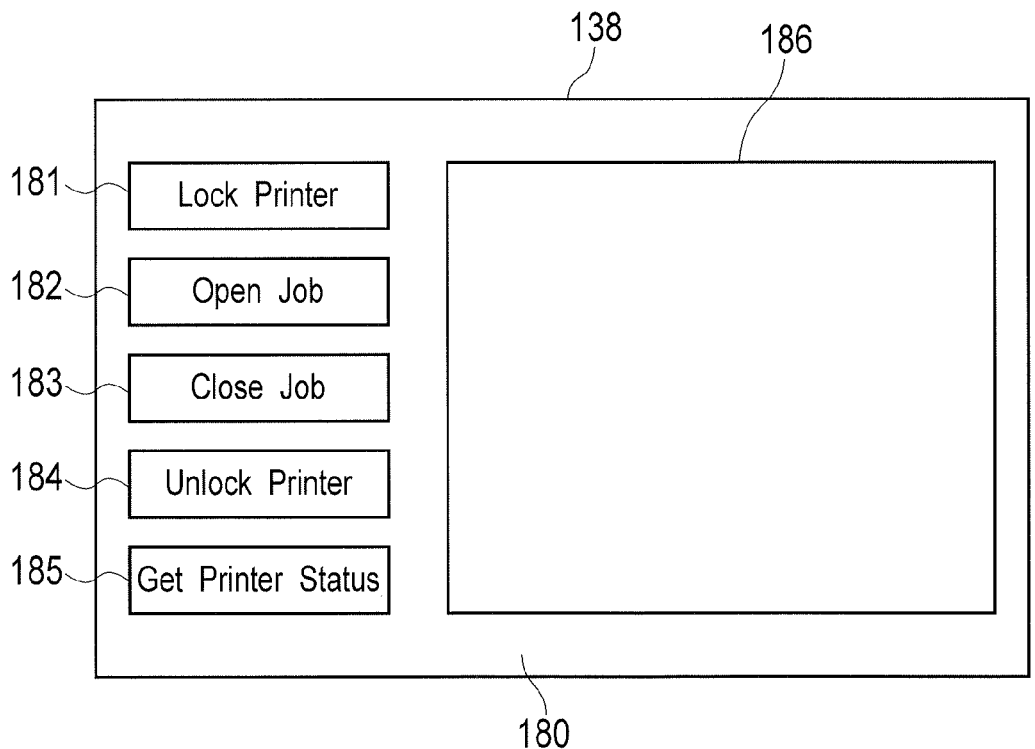
FIG. 7 is a schematic view illustrating an example of a screen displayed in a display unit in the first embodiment.

Referring back to the explanation in FIG. 4, input unit 137 accepts an input. Display unit 138 displays a screen. FIG. 7 is a schematic view illustrating an example of a screen displayed in display unit 138. Print control screen 180 serving as an image formation control screen is displayed in display unit 138. Print control screen 180 is a graphical user interface (GUI). Print control screen 180 includes Lock Printer button 181, Open Job button 182, Close Job button 183, Unlock Printer button 184, Get Printer Status button 185, and display window 186. Lock Printer button 181 is a region into which an instruction to lock image formation apparatus 110 is inputted. Open Job button 182 is a region into which an instruction to set a monitoring printing in image formation apparatus 110 is inputted. Close Job button 183 is a region into which an instruction is inputted to cancel the setting of the monitoring printing in image formation apparatus 110. Unlock Printer button 184 is a region into which an instruction to cancel the lock of image formation apparatus 110 is inputted. Get Printer Status button 185 is a region into which an instruction to acquire a status of image formation apparatus 110 is inputted. A user uses input unit 137 to input an execution instruction by selecting Lock Printer button 181, Open Job button 182, Close Job button 183, Unlock Printer button 184, or Get Printer Status button 185, thereby allowing the user to input the instructions assigned to these buttons. Display window 186 is a region on which various kinds of information are displayed. Further, input unit 137 and display unit 138 may constitute a touch panel.

Referring back to the explanation in FIG. 4, controller 140 controls the processing in client PC 130. Controller 140 is provided with printer driver unit (hereinafter, PD unit) 141 serving as a driver unit, application program unit (hereinafter, AP unit) 144, and print controller 145 serving as an image formation controller.

PD unit 141 creates print job 170 to send it to transmission unit 132, and causes transmission unit 132 to transmit print job 170 to image formation apparatus 110. PD unit 141 is provided with print job processor 142 serving as an image formation job processor, and print job transmission instruction unit 143 serving as an image formation job transmission instruction unit. Print job processor 142 creates print job 170 on the basis of a print request (image formation request) from AP unit 144. Further, print job processor 142 provides created print job 170 to print job transmission instruction unit 143, and requests the transmission of created print job 170 to the image formation apparatus 110. Moreover, when transmitting print job 170, print job processor 142 requests the transmission of printer status transmission command 173 to print controller 145 in accordance with the setting of driver status data 135a stored in driver status hold unit 135. Print job transmission instruction unit 143 provides print job 170 provided from print job processor 142 to transmission unit 132, and causes transmission unit 132 to transmit print job 170 to image formation apparatus 110.

AP unit 144 receives a print instruction (image formation instruction) via input unit 137 and display unit 138, and makes a print request to print job processor 142. In this process, for example, AP unit 144 provides data to be a print target (image formation target) to print job processor 142.

Print controller 145 controls the printing. Print controller 145 is provided with determination unit 146, lock instruction unit 147, unlock instruction unit 148, status information transmission instruction unit 149, status information processor 150, display processor 151, print monitoring set unit 152 serving as an image formation monitoring set unit, and print monitoring setting cancel unit 153 serving as an image formation monitoring setting cancel unit.

Determination unit 146 determines whether to permit lock command 171 to be sent from lock instruction unit 147. If determination unit 146 permits the lock command to be sent, lock instruction unit 147 instructs and causes transmission unit 132 to transmit lock command 171 to image formation apparatus 110. Further, when transmission unit 132 transmits lock command 171 to image formation apparatus 110, lock instruction unit 147 sets a value of lock status column 135c in driver status data 135a to "on". In addition, lock instruction unit 147 requests display processor 151 to display a result of the locking processing. Unlock instruction unit 148 instructs and causes transmission unit 132 to transmit unlock command 172 to image formation apparatus 110. Further, when transmission unit 132 transmits unlock command 172 to image formation apparatus 110, unlock instruction unit 148 sets a value of lock status column 135c in driver status data 135a to "off". In addition, unlock instruction unit 148 requests display processor 151 to display a result of the unlock processing.

Status information transmission instruction unit 149 instructs and causes transmission unit 132 to transmit printer status transmission command 173 to image formation apparatus 110. Status information processor 150 receives printer status information 174 from status information reception unit 133. Further, status information processor 150 provides received printer status information 174 to determination unit 146. Moreover, in accordance with the received printer status information 174, status information processor 150 makes a display request of a reception result to display processor 151, and stores status display data in status display data 136a.

Display processor 151 causes display unit 138 to display printer status information 174 received by status information processor 150, and the processing results by lock instruction unit 147, unlock instruction unit 148, print monitoring set unit 152, and print monitoring setting cancel unit 153. Moreover, display processor 151 creates screen data, as illustrated in FIG. 7, on print control screen 180, transmits the screen data to display unit 138, and causes display unit 138 to display such a screen. Print monitoring set unit 152 performs the setting for print monitoring. For example, when input unit 137 receives an input of a setting instruction for print monitoring, print monitoring set unit 152 sets a value of print monitoring status column 135b in driver status data 135a to "on". Moreover, print monitoring set unit 152 requests status information transmission instruction unit 149 to transmit printer status transmission command 173. In addition, print monitoring set unit 152 requests display processor 151 to display a processing result of the setting for print monitoring. Print monitoring setting cancel unit 153 cancels the setting for print monitoring. For example, when input unit 137 receives an input of a setting cancel instruction for print monitoring, print monitoring setting cancel unit 153 sets a value of print monitoring status column 135b in driver status data 135a to "off". Moreover, print monitoring setting cancel unit 153 requests display processor 151 to display a processing result of cancelling the setting for print monitoring.

Client PC 130 described in the foregoing can be implemented by a general computer provided with, for example, a CPU, a memory, an external memory device such as an HDD, a reading/writing device that reads and writes information with respect to a portable storage medium such as a compact disk (CD) or a digital versatile disk (DVD), an input device such as a key board and a mouse, a display device such as a display, and a communication device such as an NIC for connecting to a communication network. For example, storage unit 134 can be implemented such that the CPU utilizes a memory or an external memory device. Controller 140 can be implemented such that a predetermined program stored in an external memory device is loaded on the memory and the CPU executes the predetermined program. Input unit 137 can be implemented such that the CPU utilizes the input device, display unit 138 can be implemented such that the CPU utilizes the display device, and communication unit 131 can be implemented such that the CPU utilizes the communication device. The predetermined program may be downloaded to the external memory device from the storage medium via the reading/writing device, or be downloaded from the network via the communication device, and then be loaded on the memory and executed by the CPU. Moreover, the predetermined program may be directly loaded into the memory via the reading/writing device via storage medium or from the network via the communication device, and then be executed by the CPU.

Figure 8:
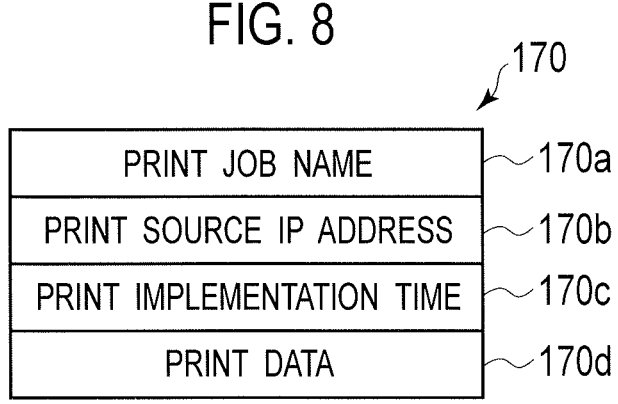
FIG. 8 is a schematic view of a print job in the first embodiment.

FIG. 8 is a schematic view of print job 170. Print job 170 includes print job name 170a, print source IP address 170b, print implementation time 170c, and print data 170d. Print job name 170a is a print job identifying information (image formation job identifying information) for identifying print job 170. Print source IP address 170b is a communication address of client PC 130 that has created print job 170. Print implementation time 170c is time information indicating a time when print job 170 is created. Print data 170d is data for forming an image on the medium.

Figure 9:
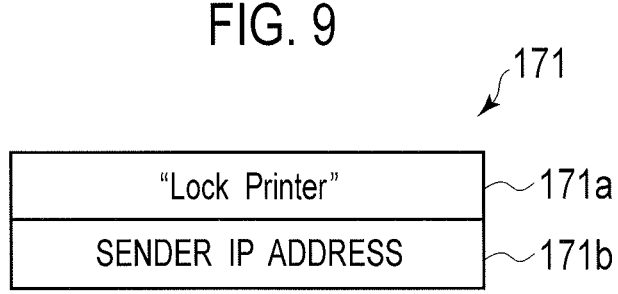
FIG. 9 is a schematic view of a lock command in the first embodiment.

FIG. 9 is a schematic view of lock command 171. Lock command 171 includes wording 171a of "Lock Printer" and sender IP address 171b. Wording 171a of "Lock Printer" is a command identifying information indicating lock command 171. Sender IP address 171b is a communication address of client PC 130 that is a sender of lock command 171.

Figure 10:
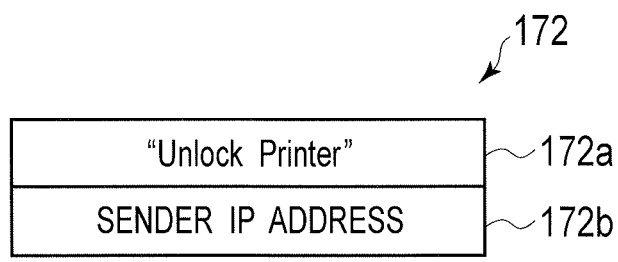
FIG. 10 is a schematic view of an unlock command in the first embodiment.

FIG. 10 is a schematic view of unlock command 172. Unlock command 172 includes wording 172a of "Unlock Printer" and sender IP address 172b. Wording 172a of "Unlock Printer" is a command identifying information indicating unlock command 172. Sender IP address 172b is a communication address of client PC 130 that is a sender of unlock command 172.

Figure 11:
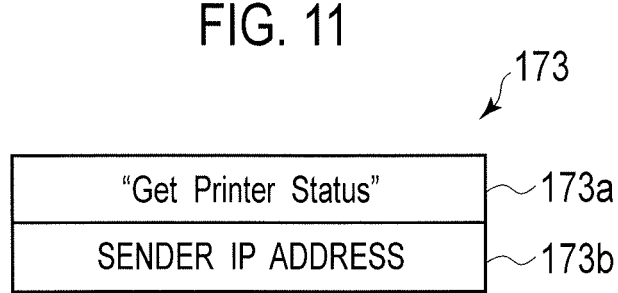
FIG. 11 is a schematic view of a printer status transmission command in the first embodiment.

FIG. 11 is a schematic view of printer status transmission command 173. Printer status transmission command 173 includes wording 173a of "Get Printer Status" and sender IP address 173b. Wording 173a of "Get Printer Status" is a command identifying information indicating printer status transmission command 173. Sender IP address 173b is a communication address of client PC 130 that is a sender of printer status transmission command 173.

Figure 12:
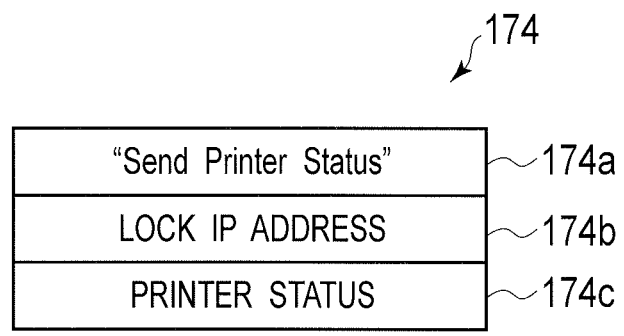
FIG. 12 is a schematic view of printer status information in the first embodiment.

FIG. 12 is a schematic view of printer status information 174. Printer status information 174 includes wording 174a of "Send Printer Status", lock IP address 174b, and printer status 174c. Wording 174a of "Send Printer Status" is a response identifying information indicating printer status information 174. Lock IP address 174b is a communication address of client PC 130 that has locked image formation apparatus 110. Further, when image formation apparatus 110 is not locked, printer status information 174 does not include lock IP address 174b. Herein, when image formation apparatus 110 is not locked, printer status 174c may include information indicating that image formation apparatus 110 is not locked. Printer status 174c is information indicating a state of image formation apparatus 110.

Explanation of Operation

Figure 13:
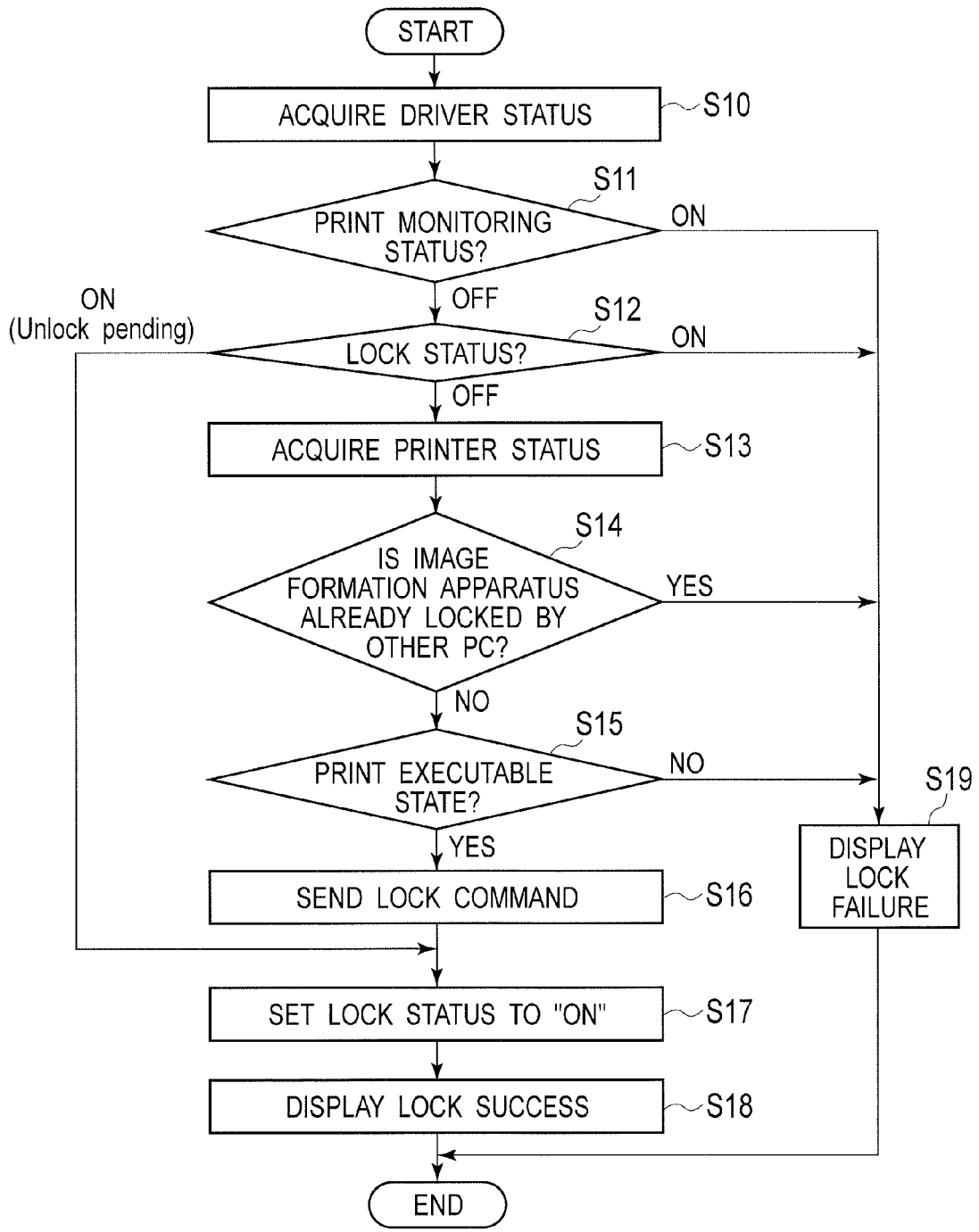
FIG. 13 is a flowchart illustrating processing of locking the image formation apparatus in the client PC in the first embodiment.

FIG. 13 is a flowchart illustrating the processing of locking image formation apparatus 110 in client PC 130. Input unit 137 detects Lock Printer button 181 being pressed in print control screen 180 to start the locking process.

When the locking process is started, lock instruction unit 147 acquires values of print monitoring status column 135b and lock status column 135c from driver status data 135a held by driver status hold unit 135 (S10). Lock instruction unit 147 sends the acquired values of print monitoring status column 135b and lock status column 135c to determination unit 146. Determination unit 146 checks the sent value of print monitoring status column 135b (S11). If the value of print monitoring status column 135b is "on", determination unit 146 notifies lock instruction unit 147 that image formation apparatus 110 cannot be locked, and the processing proceeds to Step S19. If the value of print monitoring status column 135b is "off", the processing proceeds to Step S12.

At Step S12, determination unit 146 checks the sent value of lock status column 135c. If the value of lock status column 135c is "on", determination unit 146 notifies lock instruction unit 147 that image formation apparatus 110 cannot be locked, and the processing proceeds to Step S19. If the value is "on (Unlock pending)", determination unit 146 notifies lock instruction unit 147 that the locking is waiting to be cancelled, and the processing proceeds to Step S17. If the value is "off", the processing proceeds to Step S13. At Step S13, controller 140 acquires printer status information 174 from image formation apparatus 110. Specifically, determination unit 146 notifies lock instruction unit 147 that image formation apparatus 110 is in the unlocked state. Lock instruction unit 147 makes a transmission request of printer status transmission command 173 to status information transmission instruction unit 149. Status information transmission instruction unit 149, having received such a request, creates printer status transmission command 173 in which an IP address of the owner apparatus is set as sender IP address 173b, and instructs transmission unit 132 to transmit printer status transmission command 173 to image formation apparatus 110. In image formation apparatus 110, having received such printer status transmission command 173, reception unit 112 provides received printer status transmission command 173 to processor 118. Processor 118 acquires the value of lock IP address column 115b and printer status column 115c from printer status data 115a held by printer status hold unit 115. Processor 118 creates printer status information 174 in which the acquired value of lock IP address column 115b is set to lock IP address 174b and the acquired value of printer status column 115c is set to printer status 174c. Further, processor 118 instructs and causes status information transmission unit 113 to transmit the created printer status information 174 to client PC 130 with sender IP address 173b included in the received printer status transmission command 173. In client PC 130, having received such printer status information 174, status information reception unit 133 provides the received printer status information 174 to status information processor 150. Status information processor 150 provides lock IP address 174b and printer status 174c that are included in the received printer status information 174 to determination unit 146. Further, when the received printer status information 174 does not include lock IP address 174b, status information processor 150 notifies determination unit 146 that lock IP address 174b is not set.

Determination unit 146 determines whether image formation apparatus 110 is locked by another client PC 130 (S14). For example, if lock IP address 174b is provided from status information processor 150, determination unit 146 determines that image formation apparatus 110 is locked by another client PC 130. In contrast, if determination unit 146 is notified from status information processor 150 that lock IP address 174b is not set, determination unit 146 determines that image formation apparatus 110 is not locked by another client PC 130. If image formation apparatus 110 is locked by another client PC 130 (Yes at S14), determination unit 146 notifies lock instruction unit 147 that image formation apparatus 110 cannot be locked, and the processing proceeds to Step S19. If image formation apparatus 110 is not locked by another client PC 130 (No at S14), the processing proceeds to Step S15.

At Step S15, determination unit 146 determines whether image formation apparatus 110 is in a print executable state. For example, determination unit 146 checks the provided printer status 174c, and determines that image formation apparatus 110 is in the print executable state if no error occurs in image formation apparatus 110, whereas determining that image formation apparatus 110 is not in the print executable state if an error occurs. If image formation apparatus 110 is in the print executable state, the processing proceeds to Step S16. If image formation apparatus 110 is not in the print executable state, determination unit 146 notifies lock instruction unit 147 that image formation apparatus 110 cannot be locked, and the processing proceeds to Step S19.

At Step S16, controller 140 locks image formation apparatus 110. Specifically, determination unit 146 notifies lock instruction unit 147 that image formation apparatus 110 is possible to be locked. Lock instruction unit 147 creates printer status transmission command 173 in which an IP address of the owner apparatus is set as sender IP address 173b, and instructs and causes transmission unit 132 to transmit created printer status transmission command 173 to image formation apparatus 110. In image formation apparatus 110, having received such lock command 171, image reception unit 112 provides received lock command 171 to processor 118. Processor 118 instructs lock unit 119 to lock image formation apparatus 110. Lock unit 119, having been instructed by processor 118, stores sender IP address 171b, included in lock command 171 in lock IP address column 115b, in printer status data 115a held by printer status hold unit 115. This makes image formation apparatus 110 be in a state locked by client PC 130.

At Step S17, lock instruction unit 147 sets a value of lock status column 135c to "on", in driver status data 135a held by driver status hold unit 135. Lock instruction unit 147 then requests display processor 151 to display a success of the locking processing, and display processor 151 causes display unit 138 to display the success (S18). For example, display unit 138 displays the success of the locking processing on display window 186 in print control screen 180. The processing is then ended.

In contrast, at Step S19, lock instruction unit 147 requests display processor 151 to display a failure if the locking processing is failed, and display processor 151 causes display unit 138 to display the failure. For example, display unit 138 displays the failure of the locking processing on display window 186 in print control screen 180. The processing is then ended.

Note that, in the flow described in the foregoing, the failure of the locking processing is displayed at Step S19, however, the flow is not limited to such an example. For example, if a value of lock status column 135c is determined as "on" at Step S12, an indication that image formation apparatus 110 is already locked may be displayed. Moreover, if image formation apparatus 110 is locked by another client PC 130 at Step S14, an indication that image formation apparatus 110 is already locked by another device may be displayed at Step S19. In addition, if it is determined at Step S15 that image formation apparatus 110 is not in the print executable state, an indication that that image formation apparatus 110 is not in the print executable state may be displayed.

Figure 14:
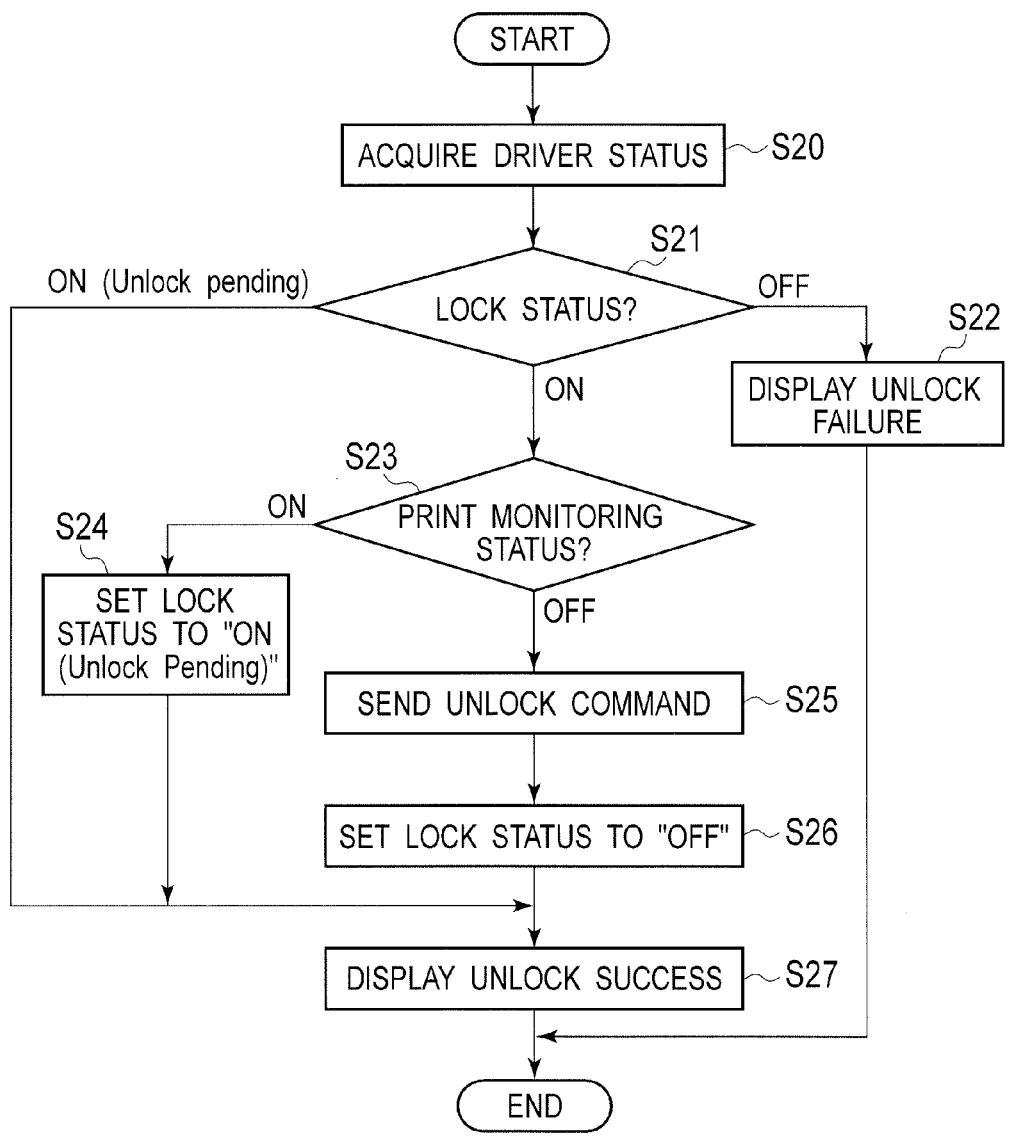
FIG. 14 is a flowchart illustrating processing of unlocking the image formation apparatus in the client PC in the first embodiment.

FIG. 14 is a flowchart illustrating the processing of unlocking image formation apparatus 110 in client PC 130. Input unit 137 detects Unlock Printer button 184 being pressed in print control screen 180 to start the unlock processing.

When the unlock processing is started, unlock instruction unit 148 acquires values of print monitoring status column 135b and lock status column 135c from driver status data 135a held by driver status hold unit 135 (S20). Unlock instruction unit 148 then checks the value of lock status column 135c acquired at Step S20 (S21). If the value of lock status column 135c is "off", the processing proceeds to Step S22. If the value of lock status column 135c is "on", the processing proceeds to Step S23. If the value of lock status column 135c is "on (Unlock pending)", the processing proceeds to Step S27.

At Step S22, unlock instruction unit 148 requests display processor 151 to display a failure of the unlock processing, and display processor 151 causes display unit 138 to display the failure. For example, display unit 138 displays the failure of the unlock processing on display window 186 in print control screen 180. The processing is then ended.

At Step S23, unlock instruction unit 148 checks the value of print monitoring status column 135$b$ acquired at Step S20. If the value of print monitoring status column 135$b$ is "on", the processing proceeds to Step S24. If the value of print monitoring status column 135$b$ is "off", the processing proceeds to Step S25.

At Step S24, unlock instruction unit 148 sets a value of lock status column 135$c$ to "on (Unlock pending)" in driver status data 135$a$. The processing then proceeds to Step S27.

At Step S25, unlock instruction unit 148 cancels the lock to image formation apparatus 110. For example, unlock instruction unit 148 creates unlock command 172 in which an IP address of the owner apparatus is set in sender IP address 172$b$, and instructs and causes transmission unit 132 to transmit created unlock command 172 to image formation apparatus 110. In image formation apparatus 110, having received such lock command 171, image reception unit 112 provides received unlock command 172 to processor 118. Processor 118 provides sender IP address 172$b$ included in unlock command 172 to unlock unit 120, and instructs unlock unit 120 to cancel the lock. Unlock unit 120 having received such an instruction determines whether a lock IP address stored in lock IP address column 115$b$ in printer status data 115$a$ held by printer status hold unit 115 matches sender IP address 172$b$ provided from processor 118. If these IP addresses match, unlock unit 120 clears the lock IP address stored in lock IP address column 115$b$.

Moreover, unlock instruction unit 148 in client PC 130 sets a value of lock status column 135$c$ to "off" in driver status data 135$a$ (S26). The processing then proceeds to Step S27.

At Step S27, unlock instruction unit 148 requests display processor 151 to display a success of the unlock processing, and display processor 151 causes display unit 138 to display the success. For example, display unit 138 displays the success of the unlock processing on display window 186 in print control screen 180. The processing is then ended.

Note that, in the flow described in the foregoing, the failure of the locking processing is displayed at Step S22, however, the flow is not limited to such an example. For example, an indication that the lock is already cancelled may be displayed.

Figure 15:
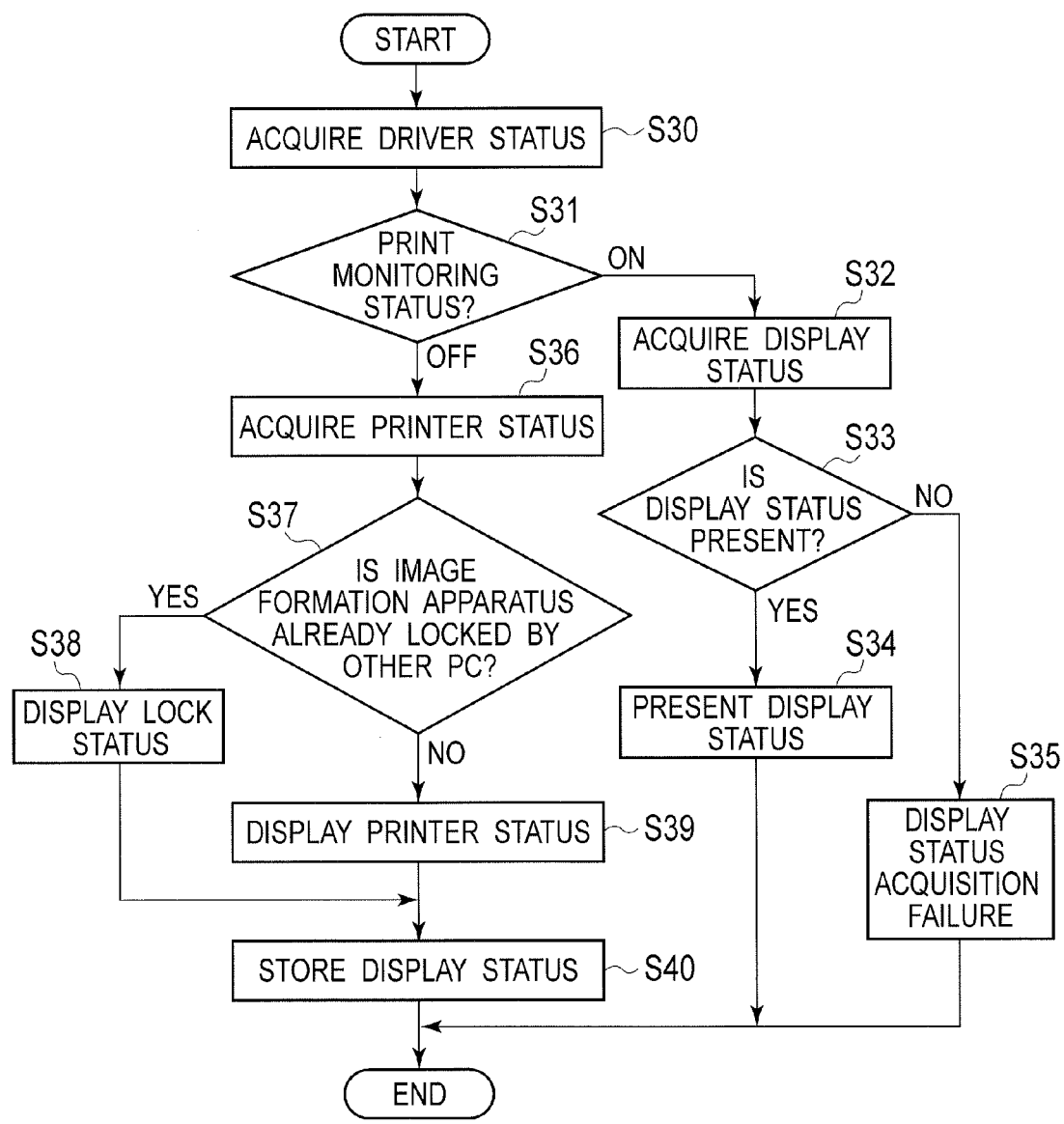
FIG. 15 is a flowchart illustrating processing of acquiring printer status information on the image formation apparatus in the client PC in the first embodiment.

FIG. 15 is a flowchart illustrating the processing of acquiring printer status information on image formation apparatus 110, in client PC 130. Input unit 137 detects Get Printer Status button 185 being pressed in print control screen 180 to start printer status information acquisition processing.

When printer status information acquisition processing is started, status information transmission instruction unit 149 acquires the value of print monitoring status column 135$b$ from driver status data 135$a$ held by driver status hold unit 135 (S30). Status information transmission instruction unit 149 then checks the value of print monitoring status column 135$b$ acquired at Step S30 (S31). If the value of print monitoring status column 135$b$ is "on", the processing proceeds to Step S32. If the value of print monitoring status column 135$b$ is "off", the processing proceeds to Step S36.

At Step S32, status information transmission instruction unit 149 does not perform a transmission of printer status transmission command 173 to image formation apparatus 110 so as to prevent a collision of the transmission with the print monitoring processing. As an alternative to the transmission, status information transmission instruction unit 149 acquires the value of a display status from status display data 136$a$ held by status display hold unit 136. Status information transmission instruction unit 149 then checks the value of the display status acquired at Step S32 (S33). If the value of the display status indicates that the display status is present, the processing proceeds to Step S34, whereas if the value thereof indicates that no display status is present, the processing proceeds to Step S35. At Step S34, status information transmission instruction unit 149 requests display processor 151 to display the display status, and display processor 151 causes display unit 138 to display information corresponding to the value of the display status. For example, display unit 138 displays information corresponding to the value of the display status on display window 186 in print control screen 180. The processing is then ended. In contrast, at Step S35, status information transmission instruction unit 149 requests display processor 151 to display a failure of the status information acquisition because no display status is set, and display processor 151 causes the display unit 138 to display the failure. For example, display unit 138 displays the failure of the status information acquisition on display window 186 in print control screen 180. The processing is then ended.

If the value of print monitoring status column 135$b$ is "off", the processing proceeds to Step S36. At Step S36, status information transmission instruction unit 149 acquires printer status information from image formation apparatus 110. For example, status information transmission instruction unit 149 creates printer status transmission command 173 in which an IP address of the owner apparatus is set as sender IP address 173$b$, and instructs and causes transmission unit 132 to transmit printer status transmission command 173 to image formation apparatus 110. In image formation apparatus 110 having received such printer status transmission command 173, reception unit 112 provides received printer status transmission command 173 to processor 118. Processor 118, having received printer status transmission command 173, acquires a lock IP address and a printer status from printer status data 115$a$ held by printer status hold unit 115, and creates printer status information 174 including the lock IP address and the printer status. Processor 118 then provides the created printer status information to status information transmission unit 113, and makes a request for transmission. Status information transmission unit 113, having received such a request, transmits created printer status information 174 to client PC 130.

In client PC 130, having received printer status information 174, status information reception unit 133 provides printer status information 174 to status information processor 150. Status information processor 150 acquires the received lock IP address and the printer status that are included in printer status information 174 (S36). Status information processor 150 then determines whether image formation apparatus 110 is already locked by another client PC 130 (S37). For example, status information processor 150 checks the acquired lock IP address, and determines that image formation apparatus 110 is already locked by another client PC 130 if the acquired lock IP address is an IP address other than the IP address of the owner apparatus. In contrast, status information processor 150 determines that image formation apparatus 110 is not locked by another client PC 130 if status information processor 150 can acquire no lock IP address (a case where printer status information 174 includes no lock IP address) or if the lock IP address is the IP address of the owner apparatus. Further, if image formation apparatus 110 is already locked by another client PC 130, the processing proceeds to Step S38, whereas if image formation apparatus 110 is not locked by another client PC 130, the processing proceeds to Step S39.

At Step S38, status information processor 150 requests display processor 151 to display the lock status, and display processor 151 causes display unit 138 to display information indicating the status. For example, display unit 138 displays an indication that image formation apparatus 110 is not locked by another device on display window 186 in print control screen 180. The processing then proceeds to Step S40. In contrast, at Step S39, status information processor 150 requests display processor 151 to display the acquired printer status, and display processor 151 causes display unit 138 to display information indicating the status. For example, display unit 138 displays the printer status on display window 186 in print control screen 180. The processing then proceeds to Step S40.

At Step S40, status information processor 150 stores the lock status if the lock status is displayed at Step S38 or the printer status if the printer status is displayed at Step S39, in status display data 136a. The processing is then ended.

As illustrated in FIG. 15, in the case where the print monitoring status is "on", the processing of acquiring status information from image formation apparatus 110 is not performed even if Get Printer Status button 185 being pressed in print control screen 180 is detected, but the status information held by status display hold unit 136 is displayed. In this case, if status display hold unit 136 holds no display status, the failure of the status information acquisition is displayed.

Figure 16:
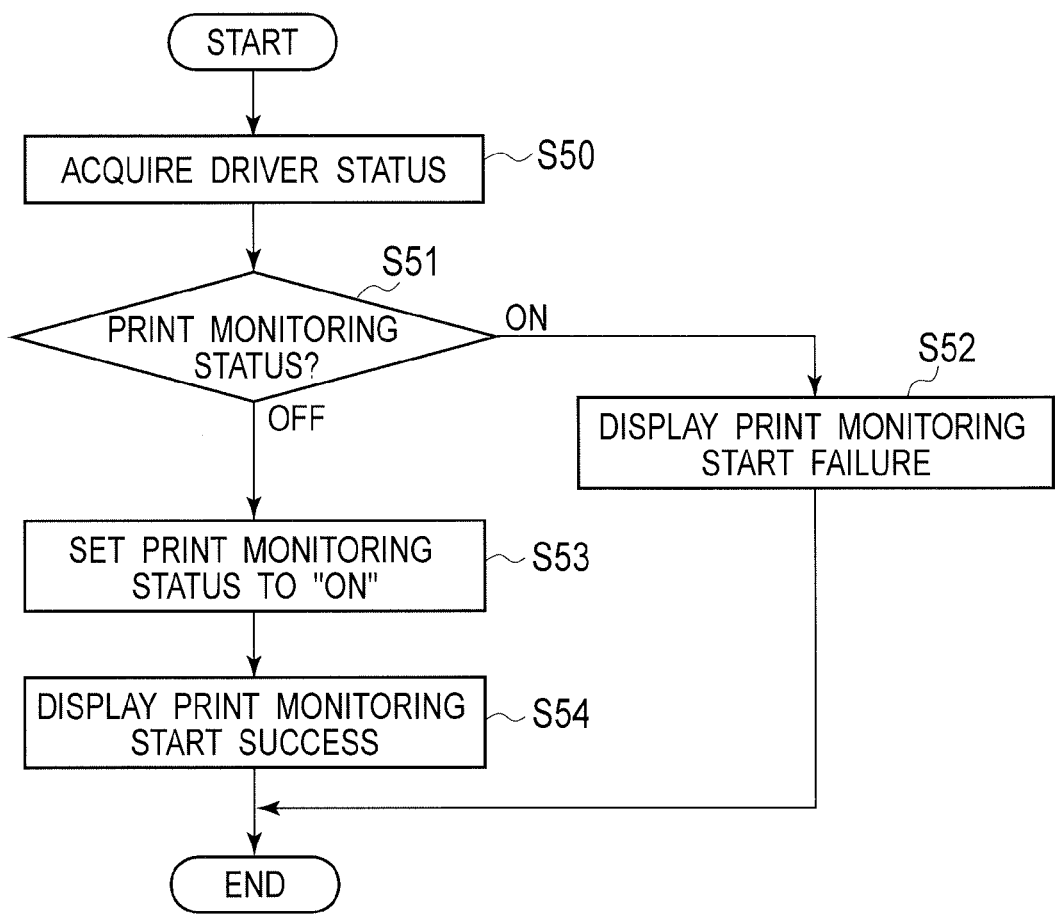
FIG. 16 is a flowchart illustrating processing of setting print monitoring of the image formation apparatus in the client PC in the first embodiment.

FIG. 16 is a flowchart illustrating the processing of setting the print monitoring of image formation apparatus 110, in client PC 130. Input unit 137 detects Open Job button 182 being pressed in print control screen 180 to start print monitoring setting processing.

When print monitoring setting processing is started, print monitoring set unit 152 acquires a value of print monitoring status column 135b from driver status data 135a held by driver status hold unit 135 (S50). Print monitoring set unit 152 then checks the value of print monitoring status column 135b acquired in Step S50 (S51). If the value of print monitoring status column 135b is "on", the processing proceeds to Step S52, and if the value is "off", the processing proceeds to Step S53.

At Step S52, print monitoring set unit 152 requests display processor 151 to display a failure of the print monitoring setting, and display processor 151 causes display unit 138 to display the failure. For example, display unit 138 displays the failure of the print monitoring setting on display window 186 in print control screen 180. The processing is then ended.

At Step S53, print monitoring set unit 152 sets a value of print monitoring status column 135b to "on" in driver status data 135a. Print monitoring set unit 152 then requests display processor 151 to display a success of the print monitoring setting, and display processor 151 causes display unit 138 to display the success (S54). For example, display unit 138 displays the success of the print monitoring setting on display window 186 in print control screen 180. The processing is then ended.

Note that, in the flow described in the foregoing, the failure of the print monitoring setting is displayed at Step S52, however, the flow is not limited to such an example. For example, an indication that the print start setting is already made may be displayed.

Figure 17:
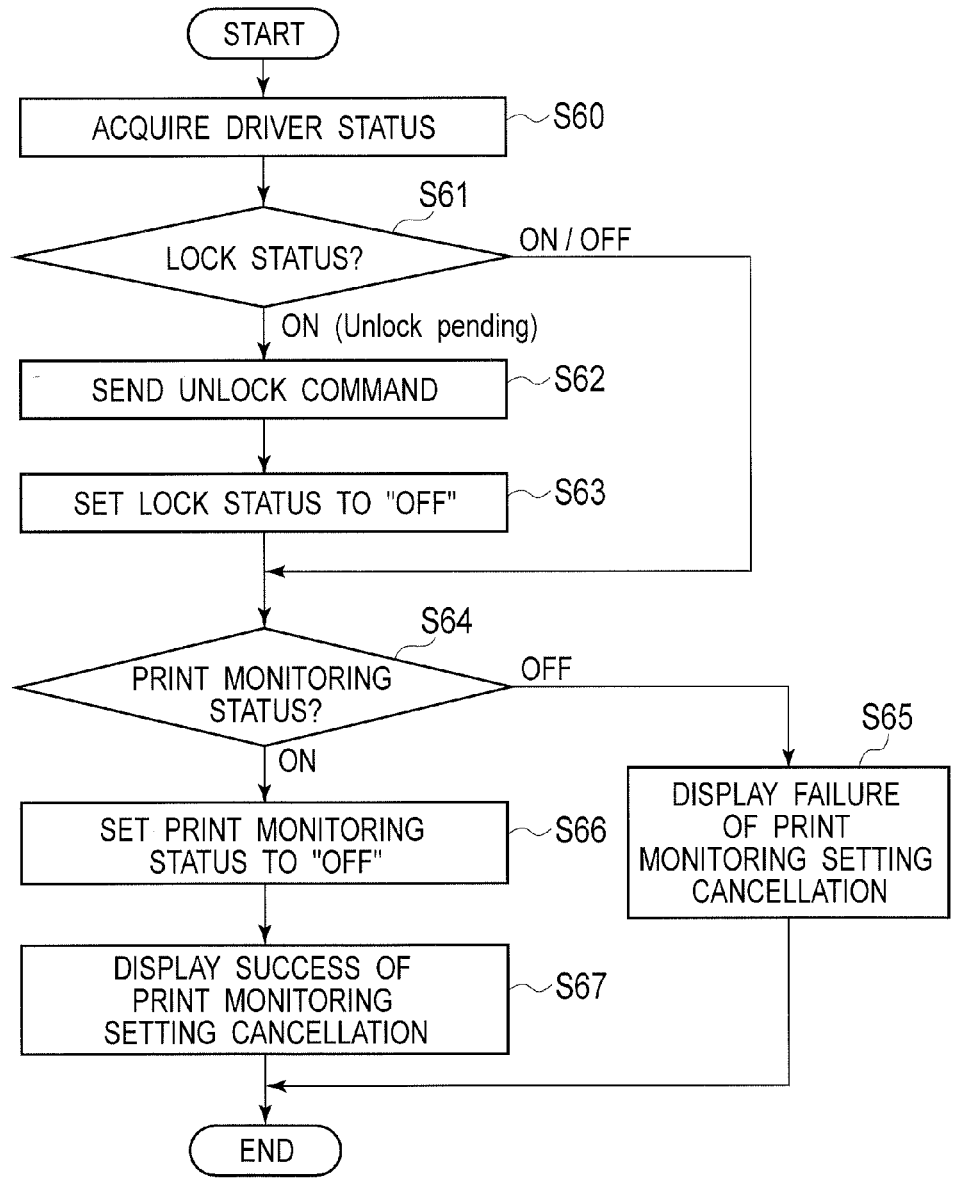
FIG. 17 is a flowchart illustrating processing of cancelling the setting of the print monitoring of the image formation apparatus in the client PC in the first embodiment.

FIG. 17 is a flowchart illustrating the processing of cancelling the setting of print monitoring on image formation apparatus 110, in client PC 130. Input unit 137 detects Close Job button 183 being pressed in print control screen 180 to start the print monitoring setting cancel processing. When the print monitoring setting cancel processing is started, print monitoring setting cancel unit 153 acquires values of print monitoring status column 135b and lock status column 135c from driver status data 135a (S60). Print monitoring setting cancel unit 153 then checks the value of lock status column 135c acquired at Step S60 (S61). If the value of lock status column 135c is "on (Unlock pending)", the processing proceeds to Step S63, whereas if the value of lock status column 135c is "on" or "off", the processing proceeds to Step S64.

At Step S62, print monitoring setting cancel unit 153 makes an unlock request to unlock instruction unit 148. Unlock instruction unit 148, having received the unlock request, cancels the lock to image formation apparatus 110. For example, unlock instruction unit 148 creates unlock command 172 in which an IP address of the owner apparatus is set in sender IP address 172b, and instructs and causes transmission unit 132 to transmit the created unlock command 172 to image formation apparatus 110. In image formation apparatus 110, having received such a command, reception unit 112 provides received unlock command 172 to processor 118. Processor 118 provides sender IP address 172b included in unlock command 172 to unlock unit 120 to instruct unlock unit 120 to cancel the lock. Unlock unit 120, having received such an instruction, determines whether a lock IP address stored in lock IP address column 115b in printer status data 115a held by printer status hold unit 115 matches sender IP address 172b provided from processor 118. If these IP addresses match, unlock unit 120 clears the lock IP address stored in lock IP address column 115b.

Moreover, unlock instruction unit 148 in client PC 130 sets a value of lock status column 135c to "off" in driver status data 135a (S63). Unlock instruction unit 148 then notifies print monitoring setting cancel unit 153 that the unlock processing is ended, and the processing proceeds to Step S64.

At Step S64, print monitoring setting cancel unit 153 checks the value of print monitoring status column 135b acquired at Step S60. If the value of print monitoring status column 135b is "off", the processing proceeds to Step S65, whereas if the value of print monitoring status column 135b is "on", the processing proceeds to Step S66.

At Step S65, print monitoring set unit 153 requests display processor 151 to display a failure of the print monitoring setting cancellation, and display processor 151 causes display unit 138 to display the failure. For example, display unit 138 displays the failure of the print monitoring setting cancellation on display window 186 in print control screen 180. The processing is then ended.

At Step S66, print monitoring setting cancel unit 153 sets a value of print monitoring status column 135b to "off" in driver status data 135a. Print monitoring setting cancel unit 153 then requests display processor 151 to display a success of the print monitoring setting cancellation, and display processor 151 causes display unit 138 to display the success. For example, display unit 138 displays the success of the print monitoring setting cancellation on display window 186 in print control screen 180. The processing is then ended.

Note that, in the flow described in the foregoing, the failure of the print monitoring setting cancellation is displayed at Step S65, however, the flow is not limited to such an example. For example, an indication that the print monitoring setting is already cancelled may be displayed.

Figure 18:
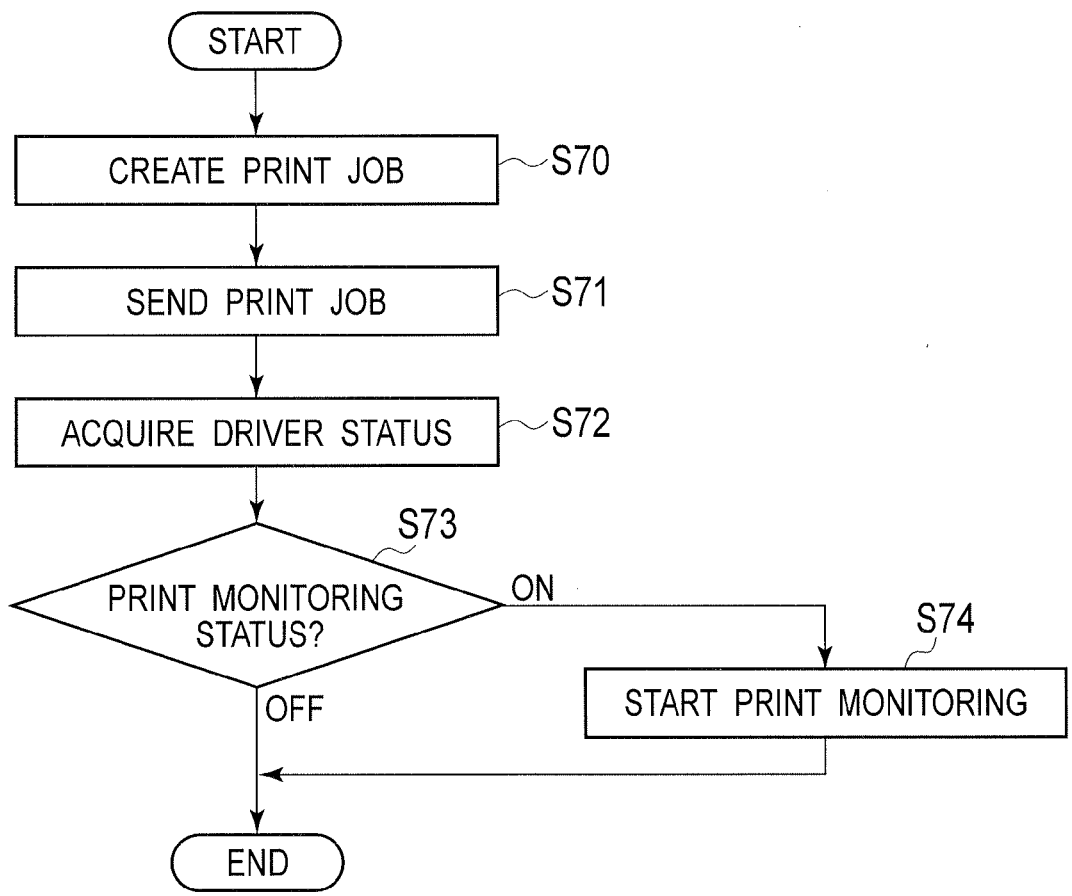
FIG. 18 is a flowchart illustrating processing of instructing print in the client PC in the first embodiment.

FIG. 18 is a flowchart illustrating the processing of instructing print in client PC 130. AP unit 144 receives a print instruction from a user to start the print instruction processing.

In client PC 130, when AP unit 144 instructs PD unit 141 to execute printing, print job processor 142 creates data to be formed on a medium on the basis of a file for which the print execution is instructed from AP unit 144. Print job processor 142 then creates print job 170 in which a file name, to which the print execution is instructed from AP unit 144, is set as print job name 170a, an IP address of the owner apparatus is set as print source IP address 170b, a current time measured in client PC 130 is set as print implementation time 170c, and created data is set as print data 170d (S70). Print job processor 142 then provides created print job 170 to print job transmission instruction unit 143. Print job transmission instruction unit 143 instructs and causes transmission unit 132 to transmit print job 170 to image formation apparatus 110 (S71).

Print job processor 142 acquires the value of print monitoring status column 135b from driver status data 135a held by driver status hold unit 135 (S72). Print job processor 142 then checks the value of print monitoring status column 135b acquired at Step S72 (S73). If the value of print monitoring status column 135b is "on", print job processor 142 starts print monitoring processing (S74). The processing is then ended. In contrast, if the value of print monitoring status column 135b is "off", print job processor 142 ends the processing without starting the print monitoring processing.

Figure 19:
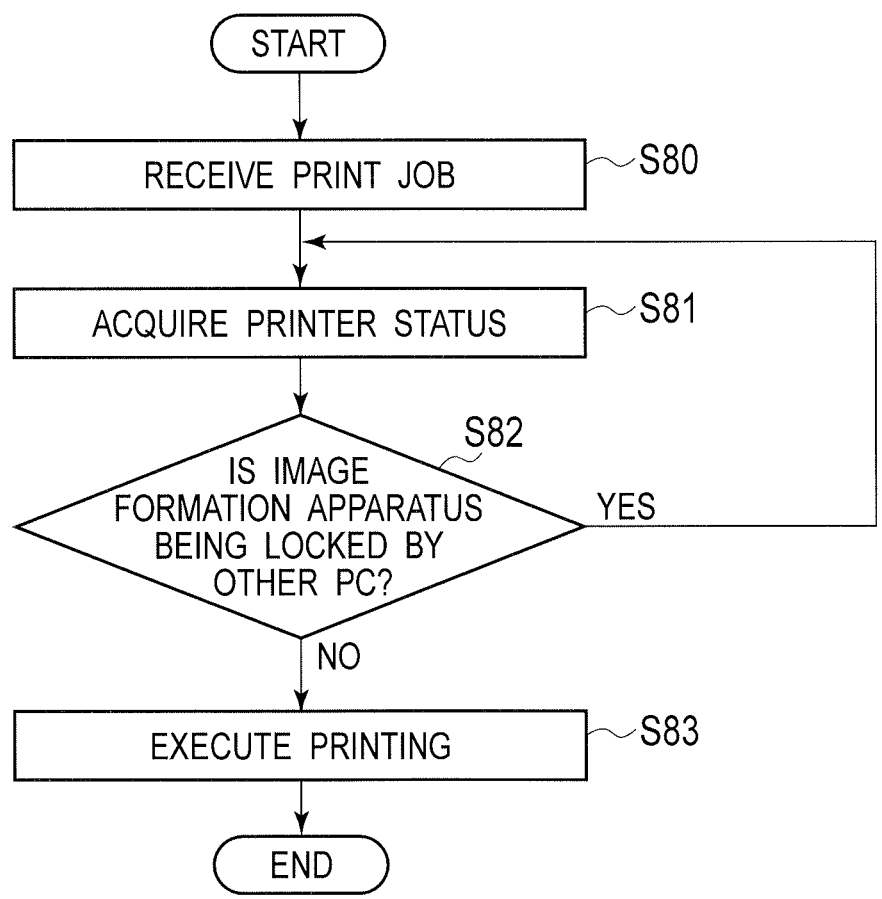
FIG. 19 is a flowchart illustrating print processing by the image formation apparatus in the first embodiment.

FIG. 19 is a flowchart illustrating print processing in image formation apparatus 110. When image formation apparatus 110 receives print job 170, reception unit 112 provides received print job 170 to processor 118 (S80). Processor 118, having received print job 170, acquires a lock IP address from printer status data 115a held by printer status hold unit 115 (S81). Processor 118 then determines whether image formation apparatus 110 is being locked by another client PC 130 (S82). For example, processor 118 checks the lock IP address acquired at Step S81, and determines that image formation apparatus 110 is locked by another client PC 130 if the lock IP address is set and is different from print source IP address 170b included in print job 170. If image formation apparatus 110 is locked by another client PC 130, processor 118 stores received print job 170 in storage unit 114 without executing the printing of received print job 170 in order to prevent received print job 170 from being mixed into print job 170 of client PC 130 other than client PC 130 with print source IP address 170b. The processing then returns to Step S81. In this case, when the lock by another client PC 130 is cancelled, the printing of stored print job 170 is executed. In contrast, if no lock IP address is set or the lock IP address is the same as print source IP address 170b included in print job 170, processor 118 determines that image formation apparatus 110 is not locked by another client PC 130, and the processing proceeds to Step S83.

At Step S83, processor 118 instructs print unit 116 to execute printing of print job 170, and print unit 116, having received the instruction, executes the printing of print job 170.

Figure 20:
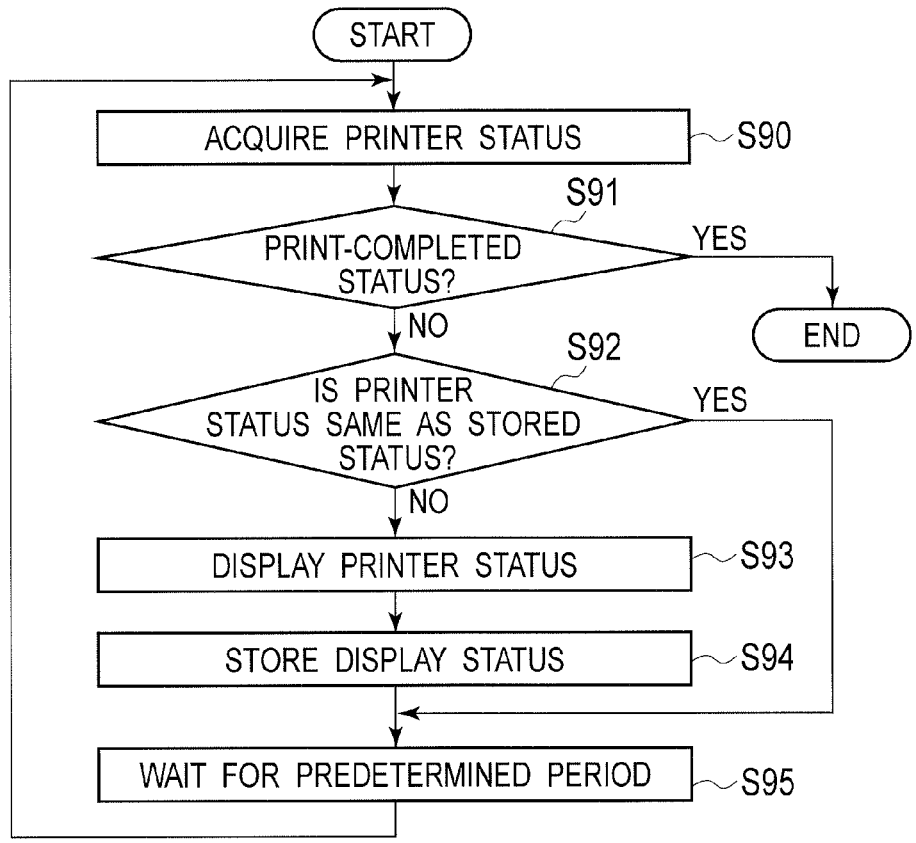
FIG. 20 is a flowchart illustrating print monitoring processing by the client PC in the first embodiment.

FIG. 20 is a flowchart illustrating the print monitoring processing in client PC 130. Print monitoring processing is started if print job processor 142 determines to start print monitoring processing at Step S74 in FIG. 18.

Print job processor 142 acquires printer status information on image formation apparatus 110 (S90). For example, print job processor 142 makes a transmission request of printer status transmission command 173 to status information transmission instruction unit 149. Status information transmission instruction unit 149, having received such a request, creates printer status transmission command 173 in which an IP address of the owner apparatus is set as sender IP address 173b to instruct transmission unit 132, thereby causing transmission unit 132 to transmit printer status transmission command 173 to image formation apparatus 110. In image formation apparatus 110, having received printer status transmission command 173, reception unit 112 provides received printer status transmission command 173 to processor 118. Processor 118, having received printer status transmission command 173, acquires a lock IP address and a printer status from printer status data 115a held by printer status hold unit 115, and creates printer status information 174 including the lock IP address and the printer status. Processor 118 then makes a request for transmission to status information transmission unit 113, and status information transmission unit 113, having received the request, transmits created printer status information 174 to client PC 130.

In client PC 130, having received printer status information 174, status information reception unit 133 provides received printer status information 174 to status information processor 150. Status information processor 150 acquires a printer status from received printer status information 174, and provides the acquired printer status to print job processor 142. Print job processor 142 checks the received printer status (S91). If the printer status indicates a print-completed status, the processing is ended, whereas if the printer status is not a print-completed status, the processing proceeds to Step S92.

At Step S92, status information processor 150 checks the printer status acquired at Step S90, and compares the printer status with a display status stored in status display data 136a held by status display hold unit 136. If these statuses are different from each other, the processing proceeds to Step S93, whereas if these statuses are the same, the processing proceeds to Step S95.

At Step S93, status information processor 150 requests display processor 151 to display the printer status acquired at Step 90, and display processor 151 causes display unit 138 to display information indicating the status. Herein, display processor 151 preferably causes display unit 138 to display the statuses obtained after the print monitoring processing is started, as a list. Status information processor 150 then stores the printer status in status display data 136a (S94). The processing then proceeds to Step S95. At Step S95, status information processor 150 waits a predetermined period. The processing then returns to Step S90.

As in the foregoing, with the first embodiment, the status of image formation apparatus 110 is checked by using the lock function, whereby whether image formation apparatus 110 is in an already locked state by another client PC 130 or a print unexecutable state can be checked and a useless printing operation can be prevented. Moreover, print controller 145 has the lock function and the unlock function, and thereby can implement the lock at a timing intended by a user, and to prevent print job 170 from being interrupted. In addition, periodic acquisition of a printer status during printing under print monitoring makes it possible to quickly detect an abnormality occurring during the printing.

Second Embodiment

Figure 21:
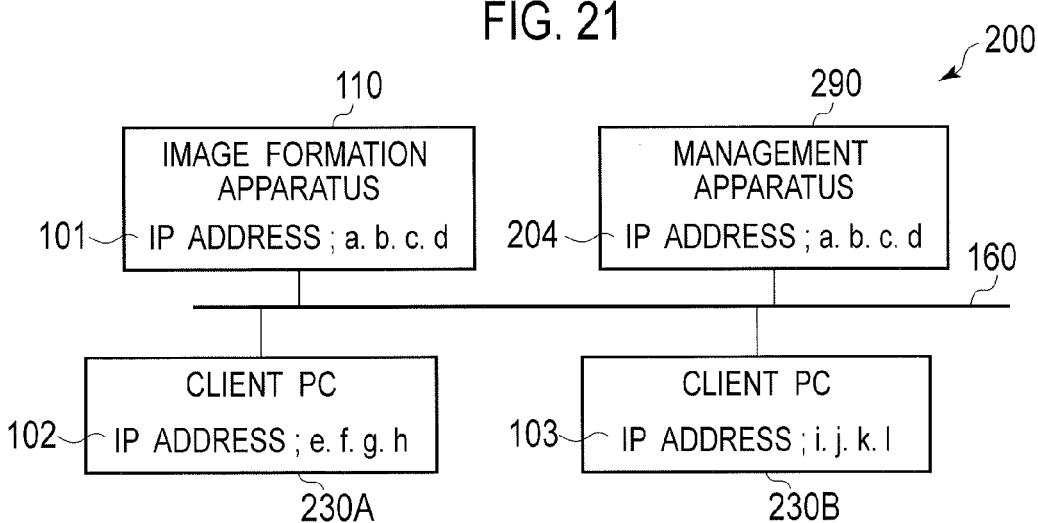
FIG. 21 is a schematic view illustrating a configuration of an image formation system according to a second embodiment.

FIG. 21 is a schematic view illustrating a configuration of image formation system 200 according to a second embodiment. As illustrated in FIG. 21, image formation system 200 is provided with image formation apparatus 110, client PCs 230A and 230B (are collectively called client PC 230 when there is no particular need to distinguish therebetween), and management apparatus 290. Image formation apparatus 110, client PC 230, and management apparatus 290 are connected to network 160. Image formation apparatus 110, client PC 230A, client PC 230B, and management apparatus 290 are respectively assigned with IP address 101, IP address 102, IP address 103, and IP address 204. Further, image formation apparatus 110 in the second embodiment is configured similar to that in the first embodiment. Moreover, an image formation method in the second embodiment is executed by image formation system 200.

Figure 22:
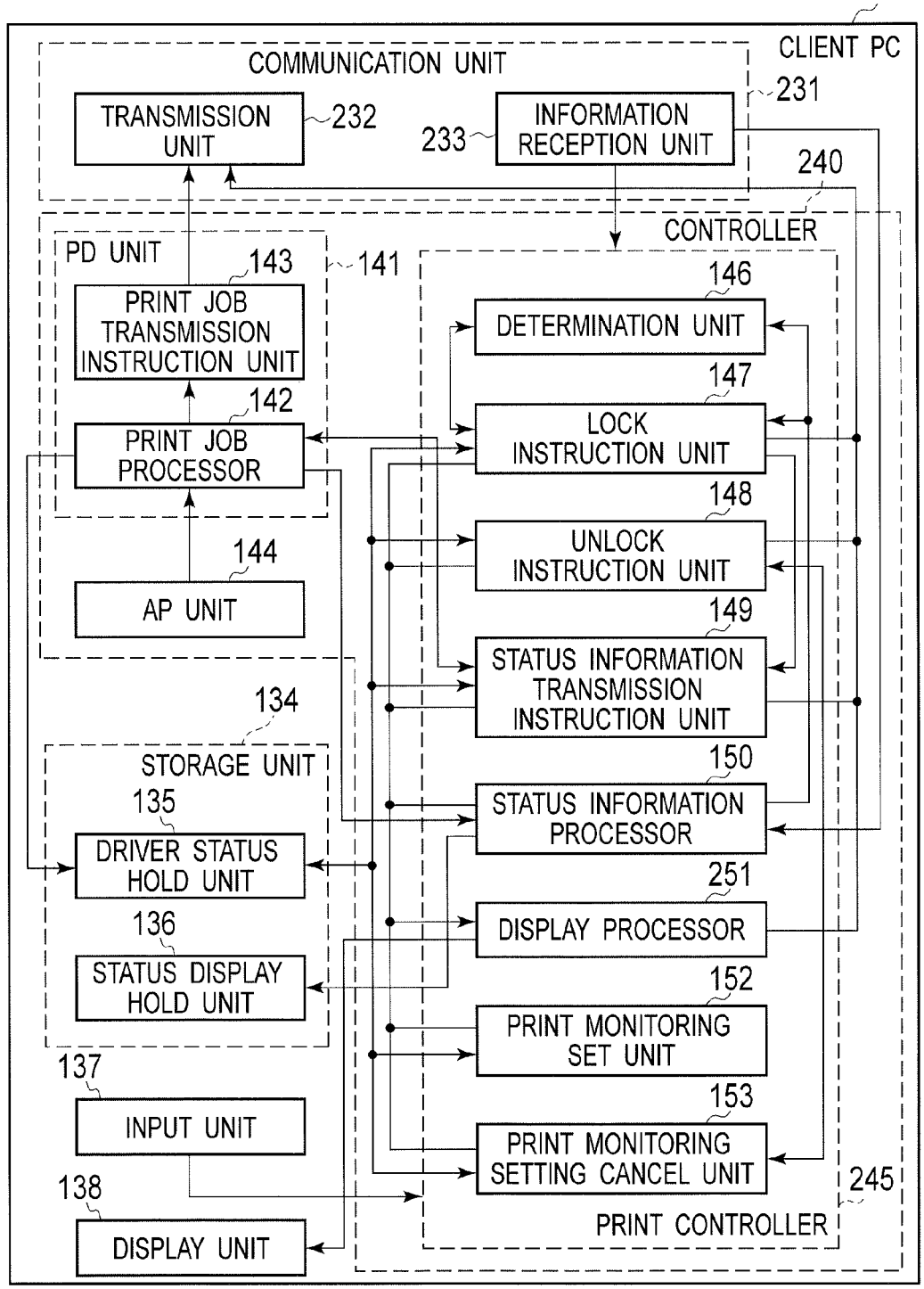
FIG. 22 is a block diagram schematically illustrating a configuration of a client PC in the second embodiment.

FIG. 22 is a block diagram schematically illustrating a configuration of client PC 230 in the second embodiment. Client PC 230 is provided with communication unit 231, storage unit 134, and controller 240. Client PC 230 in the second embodiment is different from client PC 130 in the first embodiment in the information being received/transmitted in communication unit 231, and the processing in controller 240.

Communication unit 231 performs communication with network 160. Communication unit 231 is provided with transmission unit 232 and information reception unit 233. Transmission unit 232 receives an instruction from controller 240 to transmit print job 170, lock command 171, unlock command 172, and printer status transmission command 173 to image formation apparatus 110. Moreover, transmission unit 232 receives an instruction from controller 240 to transmit screen data to management apparatus 290.

Information reception unit 233 receives printer status information 174 transmitted from image formation apparatus 110, and provided printer status information 174 to controller 240. Moreover, information reception unit 233 receives input information transmitted from management apparatus 290, and provides the input information to controller 240.

Controller 240 controls the processing in client PC 230. Controller 240 is provided with PD unit 141, AP unit 144, and print controller 245 serving as an image formation controller. Controller 240 in the second embodiment is different from controller 140 in the first embodiment in the processing in print controller 245.

Print controller 245 controls printing. In the first embodiment, print controller 145 performs processing in accordance with an input received by input unit 137. In contrast, in the second embodiment, print controller 245 performs processing in accordance with input information received by information reception unit 233. Print controller 245 in the second embodiment is provided with determination unit 146, lock instruction unit 147, unlock instruction unit 148, status information transmission instruction unit 149, status information processor 150, display processor 251, print monitoring set unit 152, and print monitoring setting cancel unit 153. Print controller 245 in the second embodiment is different from print controller 145 in the first embodiment in performing processing in accordance with input information received by information reception unit 233, and the processing in display processor 251.

Display processor 251 creates screen data for displaying printer status information 174 received by status information processor 150, and processing the results by lock instruction unit 147, unlock instruction unit 148, print monitoring set unit 152, and print monitoring setting cancel unit 153. Display processor 251 then transmits the created screen data to transmission unit 232, and causes transmission unit 232 to transmit the created screen data to management apparatus 290. Moreover, display processor 251 creates screen data, as illustrated in FIG. 7, on print control screen 180, transmits the screen data to transmission unit 232, and causes transmission unit 232 to transmit the screen data to management apparatus 290.

Figure 23:
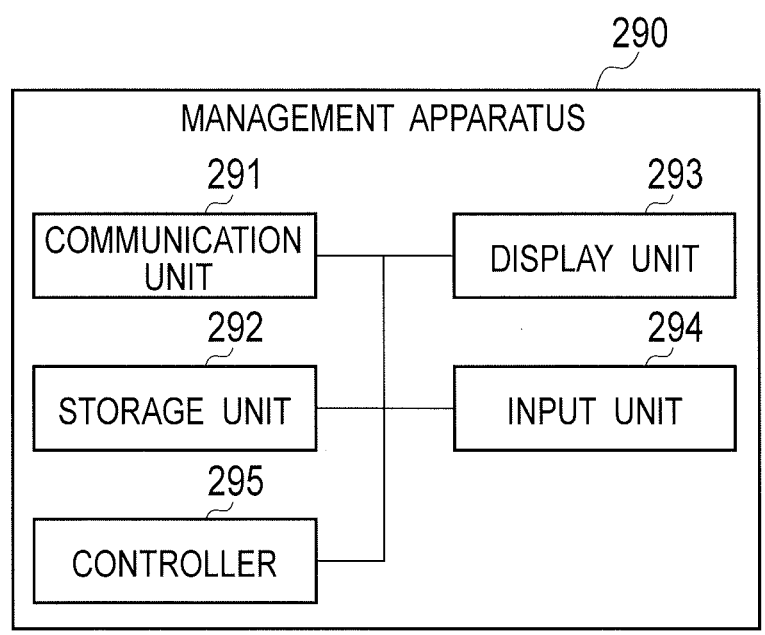
FIG. 23 is a block diagram schematically illustrating a configuration of a management apparatus in the second embodiment.

FIG. 23 is a block diagram schematically illustrating a configuration of management apparatus 290. Management apparatus 290 is provided with communication unit 291, storage unit 292, display unit 293, input unit 294, and controller 295.

Communication unit 291 performs communication with network 160. For example, communication unit 291 receives screen data transmitted from client PC 230, and provides the screen data to controller 295. Moreover, communication unit 291 transmits, in response to an instruction from controller 295, input information indicating an input content into input unit 294, to client PC 230. Storage unit 292 stores therein information necessary for processing in management apparatus 290. Display unit 293 displays a screen. For example, display unit 293 displays print control screen 180 as illustrated in FIG. 7. Moreover, display unit 293 displays a screen illustrating various kinds of processing results in client PC 230. Input unit 294 accepts an input. Controller 295 controls the processing in management apparatus 290. For example, controller 295 receives screen data from communication unit 291, and provides the screen data to display unit 293. Moreover, controller 295 creates input information indicating the content, the input of which is accepted by input unit 294, and instructs communication unit 291 to transmit the input information to client PC 230.

Management apparatus 290 described in the foregoing can be implemented by a general computer provided with, for example, a CPU, a memory, an external memory device such as an HDD, a reading/writing device that reads and writes information with respect to a portable storage medium such as a CD or a DVD, an input device such as a key board and a mouse, a display device such as a display, and a communication device such as an NIC for connecting to a communication network. For example, storage unit 292 can be implemented such that the CPU utilizes a memory or an external memory device; controller 295 can be implemented such that a predetermined program stored in an external memory device is loaded on the memory and the CPU executes the predetermined program; input unit 294 can be implemented such that the CPU utilizes the input device; display unit 293 can be implemented such that the CPU utilizes the display device; and communication unit 291 can be implemented such that the CPU utilizes the communication device. The predetermined program may be downloaded to the external memory device from the storage medium via the reading/writing device or be downloaded from the network via the communication device, and then be loaded in the memory and executed by the CPU. Moreover, the predetermined program may be directly loaded in the memory via the reading/writing device via the storage medium, or from the network via the communication device, and then be executed by the CPU.

As in the foregoing, in the second embodiment, management apparatus 290 displays the screen and accepts the input which are respectively displayed and accepted in the first embodiment. This allows the processing in client PC 230 to be controlled from a distant place.

In the first and second embodiments described in the foregoing, determination unit 146 determines to permit a lock instruction to be sent when image formation apparatus 110 is not in the locked state and image formation apparatus 110 is in the print executable state, however, the embodiments are not limited to such an example. For example, determination unit 146 may determine to permit a lock instruction to be sent when image formation apparatus 110 is not in the locked state. Moreover, determination unit 146 may determine to permit a lock instruction to be sent when image formation apparatus 110 is in the print executable state.

In the first and second embodiments described in the foregoing, determination unit 146 checks provided printer status 174c, and determines that image formation apparatus 110 is in the print executable state if no error occurs in image formation apparatus 110, whereas it determines that image formation apparatus 110 is not in the print executable state if an error occurs. However, the embodiments are not limited to such an example. For example, storage unit 134 may store in advance therein print unexecutable status information (image formation unexecutable status information) indicating a printer status where the printing is not executable, and determination unit 146 may determine that image formation apparatus 110 is not in the print executable state when the provided printer status 174c is a printer status where the printing is not executable. In this case, for example, even if printer status 174c indicates the occurrence of an error, and if the error occurs in a function that is not to be used in the printing instructed by client PC 130, determination unit 146 may determine that image formation apparatus 110 is in the print executable state. For example, when printing instructed by client PC 130 uses A4-size paper, and printer status 174c indicates that there is no A3-size paper, determination unit 146 may determine that image formation apparatus 110 is in the print executable state.

In the first and second embodiments described in the foregoing, image formation system 100 in which image formation apparatus 110 is used has been explained, however, the invention is applicable across various kinds of apparatuses that multiple personal computers use.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation system including at least an image formation apparatus, a first external apparatus, and a second external apparatus, the image formation system comprising:
   a plurality of processors that execute control programs, such that one or more of the plurality of processors is configured to perform operations comprising:
   operation as a status information transmission instruction unit that sends a status information transmission instruction;
   sending status information indicating a state of the image formation apparatus in response to the sent status information transmission instruction;
   receiving the status information;
   operation as a determination unit that determines whether to permit a lock instruction to be sent based on the received status information, the lock instruction causing the image formation apparatus to shift to a locked state in which image formation instructed by only the first external apparatus is executable;
   operation as a lock instruction unit that sends the lock instruction when the determination unit permits;
   operation as a lock unit that causes the image formation apparatus to shift to the locked state in accordance with the sent lock instruction;
   operation as an unlock instruction unit that sends an unlock instruction to cancel the locked state; and
   operation as an unlock unit that causes the image formation apparatus to shift to an unlocked state in accordance with the sent unlock instruction,
   wherein the operation as the determination unit permits the lock instruction to be sent when determining that the image formation apparatus is not in the locked state on the basis of the status information.

2. The image formation system according to claim 1, wherein the one or more of the plurality of processors is configured to perform operations such that operation as the determination unit permits the lock instruction to be sent, when determining that the image formation apparatus is not in the locked state but is in an image formation executable state on the basis of the received status information.

3. The image formation system according to claim 1, wherein
   at least one of the plurality of processors in the image formation apparatus is configured to perform the operations comprising operation as the lock unit, operation as the unlock unit, and sending the status information to the first external apparatus,
   at least one of the plurality of processors in the first external apparatus is configured to perform the operations comprising operation as the lock instruction unit, operating as the unlock instruction unit, operation as the status information transmission instruction unit, operation as the determination unit, and receiving the status information,
   the at least one of the plurality of the processors in the first external apparatus is configured to perform operations such that:
   operation as the lock instruction unit comprises sending the lock instruction to the image formation apparatus,
   operation as the unlock instruction unit comprises sending the unlock instruction to the image formation apparatus, and
   operation as the status information transmission instruction unit comprises sending the status information transmission instruction to the image formation apparatus.

4. The image formation system according to claim 3, wherein the at least one of the plurality of processors in the first external apparatus further is configured to perform operations further comprising operation as a display unit that displays the state of the image formation apparatus on the basis of the status information.

5. The image formation system according to claim 3, wherein
   the at least one of the plurality of processors in the first external apparatus is configured to perform operations further comprising:
   operation as a print monitoring set unit that sets the first external apparatus to be in an image formation monitoring state in which the first external apparatus monitors image formation executed in the image formation apparatus; and
   operation as an image formation monitoring setting cancel unit that cancels the setting of the image formation monitoring state, and when the image formation monitoring state is set, the at least one of the plurality of processors in the first external apparatus is configured to perform operation such that operation as the status information transmission instruction unit comprises periodically sending the status information transmission instruction to the image formation apparatus.

6. The image formation system according to claim 5, wherein the at least one of the plurality of processors in the first external apparatus is configured to perform operation such that operation as the lock instruction unit comprises not sending the lock instruction to the image formation apparatus when the image formation monitoring state is set.

7. The image formation system according to claim 5, wherein the at least one of the plurality of processors in the first external apparatus is configured to perform operation such that
   operation as the unlock instruction unit comprises not sending the unlock instruction to the image formation apparatus when the image formation monitoring state is set, and
   operation as the unlock instruction unit comprises sending the unlock instruction to the image formation apparatus after the setting of the image formation monitoring state is cancelled.

8. The image formation system according to claim 5, wherein
   the at least one of the plurality of processors in the first external apparatus further performs operation as a status display hold unit that holds the status information displayed by operation as a display unit, and
   the operation as the display unit displays, when the first external apparatus is in the image formation monitoring state and the operation as the status display hold unit does not hold the status information, that acquisition of the status information is failed.

9. The image formation system according to claim 3, wherein the at least one of the plurality of processors in the first external apparatus is configured to perform operations further comprising:
   creating an image formation job; and
   operation as an image formation job transmission instruction unit that sends the created image formation job to the image formation apparatus.

10. The image formation system according to claim 9, wherein the image formation apparatus further comprises a print device unit that executes image formation on the basis of the image formation job.

11. The image formation system according to claim 1, wherein
   the unlocked state is a state in which image formation instructed by any of the first external apparatus and the second external apparatus is executable.

12. The image formation system according to claim 1, wherein
   when the image formation apparatus is in the locked state in which image formation instructed by only the first external apparatus is executable, the one or more of the plurality of processors is configured to perform operations such that the status information is sent indicating that the image formation apparatus is in the locked state, in response to the status information transmission instruction sent from the second external apparatus.

13. An image formation method executed by an image formation system including at least an image formation apparatus, a first external apparatus, and a second external apparatus, the image formation method comprising:
   sending a status information transmission instruction;
   sending status information indicating a state of the image formation apparatus in response to the sent status information transmission instruction;
   receiving the status information;
   determining whether to permit a lock instruction to be sent on the basis of the status information thus received, the lock instruction causing the image formation apparatus to shift to a locked state in which only image formation instructed by the first external apparatus is executable;
   sending the lock instruction when the lock instruction is permitted to be sent;
   causing the image formation apparatus to shift to the locked state in accordance with the sent lock instruction;
   sending an unlock instruction that is an instruction to cancel the locked state; and
   causing the image formation apparatus to shift to an unlocked state in accordance with the sent unlock instruction, wherein
   in the determining whether to permit the lock instruction to be sent, the lock instruction is permitted to be sent when it is determined that the image formation apparatus is not in the locked state on the basis of the status information.

14. The image formation method according to claim 13, wherein
   the unlocked state is a state in which image formation instructed by any of the first external apparatus and the second external apparatus is executable.

15. The image formation method according to claim 13, wherein
   the sending of the status information in response to the sent status information transmission instruction comprises sending, when the image formation apparatus is in the locked state in which image formation instructed by only the first external apparatus is executable, the status information indicating that the image formation apparatus is in the locked state, in response to the status information transmission instruction sent from the second external apparatus.

16. An processing apparatus communicatable to an image formation apparatus, the processing apparatus comprising:
   a processor that executes a control program and is configured by the control program to perform operations comprising:
   operation as a status information transmission instruction unit that sends a status information transmission instruction instructing the image formation apparatus;
   operation as a determination unit that determines whether to permit sending a lock instruction to the image formation apparatus based on a status information indicating a state of the image formation apparatus sent from the image formation apparatus, the lock instruction instructing the image formation apparatus to shift to a locked state in which the image formation apparatus is able to execute an image formation instruction sent only from the processing apparatus while the image formation apparatus is unable to execute an image formation instruction sent from other processing apparatuses other than the processing apparatus; and
   operation as a lock instruction unit that sends, when the determination unit permits, the lock instruction to the image formation apparatus,
   wherein the processor is configured to perform operations such that operation as the determination unit permits sending of the lock instruction to the image formation apparatus, when the image formation apparatus is not in a locked state locked by one of the other processing apparatuses.

17. The processing apparatus according to claim 16, wherein
the status information sent from the image formation apparatus comprises the status information indicating that the image formation apparatus is in a locked state in which image formation instructed by only another processing apparatus other than the processing apparatus is executable in the image formation apparatus.

18. A method of controlling an image formation apparatus by a processing apparatus comprising:
sending a status information transmission instruction to the image formation apparatus, the status information transmission instruction instructing the image formation apparatus to send status information indicating a state of the image formation apparatus;
determining, based on the status information sent from the image formation apparatus, whether to permit to send a lock instruction to the image formation apparatus, the lock instruction instructing the image formation apparatus to shift to a locked state in which the image formation apparatus is allowed to execute an image formation instruction sent only from the processing apparatus while being not allowed to execute an image formation instruction sent from other processing apparatuses other than the processing apparatus; and
sending the lock instruction to the image formation apparatus, when the determining step determines to permit to send the lock instruction,
wherein the determining whether to permit to send the lock instruction permits to send the lock instruction to the image formation apparatus, when the image formation apparatus is not in a locked state under one of the other processing apparatuses.

19. The method according to claim 18, wherein
the status information sent from the image formation apparatus comprises the status information indicating that the image formation apparatus is in a locked state in which image formation instructed by only one of the other processing apparatuses other than the processing apparatus is executable in the image formation apparatus.

20. An image formation system including at least an image formation apparatus, a first external apparatus, and a second external apparatus,
wherein the first external apparatus includes:
a first processor that executes a control program and is configured by the control program to perform operations comprising:
operation as a first communication unit that sends a status information transmission instruction and then receives status information from the image formation apparatus;
operation as a determination unit that determines, based on the status information received by the first communication unit, whether to permit sending of a first instruction to set the status information to a first status information, wherein the first status information indicates that the image formation apparatus is in a first state in which image formation instructed by only the first external apparatus is executable and image formation instructed by the second external apparatus is not executable,
wherein the first processor is configured to perform operations such that operation as the first communication unit comprises sending, based on the determination by the determination unit, the first instruction, and
wherein the image formation apparatus includes:
a second processor that executes a control program and is configured by the control program to perform operations comprising:
operation as a second communication unit that sends the status information of the image formation apparatus in response to the status information transmission instruction sent from the first communication unit; and
operation as a controller that sets the status information of the image formation apparatus to the first status information in accordance with the first instruction sent from the first communication unit.

21. The image formation system according to claim 20, wherein
the first processor is configured to perform operations such that:
operation as the first communication unit comprises sending a second instruction to set the status information to a second status information, wherein the second status information indicates that the image formation apparatus is in a second state in which image formation instructed by either of the first external apparatus or the second external apparatus is executable,
the second processor is configured to perform operations such that:
operation as the controller comprises setting, in accordance with the second instruction sent from the first communication unit, the status information of the image formation apparatus from the first status information to the second status information, and
the first processor is configured to perform operations such that:
operation as the determination unit permits sending of the first instruction to set the status information to the first status information, when determining, on the basis of the status information, that the status information is not a third status information, wherein the third status information indicates that the image formation apparatus is in a third state in which the image formation instructed by the first external apparatus is not executable and image formation instructed only by the second external apparatus is executable.

22. The image formation system according to claim 21, wherein
the first processor is configured to perform operations such that:
operation as the determination unit comprises permitting sending of the first instruction when determining, on the basis of the status information, that the status information is not the third status information and the image formation apparatus is in an image formation executable state.

23. The image formation system according to claim 20, wherein
the first processor in the first external apparatus further is configured to perform operations further comprising operation as a display unit that displays a state of the image formation apparatus based on the status information of the image formation apparatus.

24. The image formation system according to claim 20, wherein
- the first processor in the first external apparatus is configured to perform operations further comprising:
  - operation as a print monitoring set unit that sets the first external apparatus to be at an image formation monitoring state in which the first external apparatus monitors image formation executed in the image formation apparatus; and
  - operation as an image formation monitoring setting cancel unit that cancels the setting of the image formation monitoring state, and
- the first processor is configured to perform operations such that operation as the first communication unit comprises periodically sending the status information transmission instruction to the image formation apparatus, when the image formation monitoring state is set.

25. The image formation system according to claim 24, wherein the first processor is configured to perform operations such that operation as the first communication unit comprises
- not sending a second instruction to the second communication unit when the image formation monitoring state is set, and
- sending the second instruction to the second communication unit after the setting of the image formation monitoring state is cancelled.

* * * * *